United States Patent
Kageyama et al.

(10) Patent No.: US 11,441,911 B2
(45) Date of Patent: Sep. 13, 2022

(54) NAVIGATION SYSTEM AND NAVIGATION METHOD

(71) Applicant: Clarion Co., Ltd., Saitama (JP)

(72) Inventors: Katsuhiko Kageyama, Tokyo (JP); Takaaki Sekiguchi, Tokyo (JP); Shinichi Amaya, Saitama (JP); Yuuki Takaoka, Saitama (JP)

(73) Assignee: Clarion Co., Ltd., Saitama (JP)

( * ) Notice: Subject to any disclaimer, the term of this patent is extended or adjusted under 35 U.S.C. 154(b) by 41 days.

(21) Appl. No.: 16/762,854

(22) PCT Filed: Nov. 8, 2018

(86) PCT No.: PCT/JP2018/041534
§ 371 (c)(1),
(2) Date: May 8, 2020

(87) PCT Pub. No.: WO2019/093432
PCT Pub. Date: May 16, 2019

(65) Prior Publication Data
US 2020/0284595 A1  Sep. 10, 2020

(30) Foreign Application Priority Data
Nov. 10, 2017 (JP) .............................. JP2017-217084

(51) Int. Cl.
*G01C 21/34* (2006.01)
*G01C 21/36* (2006.01)

(52) U.S. Cl.
CPC ..... *G01C 21/3415* (2013.01); *G01C 21/3492* (2013.01); *G01C 21/367* (2013.01)

(58) Field of Classification Search
CPC ............ G01C 21/3415; G01C 21/3492; G01C 21/367; G01C 21/3863; G01C 21/3679; G06F 9/48; G08G 1/0969; G09B 29/00
See application file for complete search history.

(56) References Cited

U.S. PATENT DOCUMENTS 9,176,771 B2 *  11/2015  Nagai .................... G06F 9/4843
2001/0019309 A1 *  9/2001  Saeki ............... G08G 1/096866
340/995.1

(Continued)

FOREIGN PATENT DOCUMENTS

EP          2083247 A2        7/2009
WO      WO 2011/101895 A1   8/2011

OTHER PUBLICATIONS

Extended European Search Report dated Jul. 19, 2021 for corresponding European Application No. 18876687.7 (12 pages).

(Continued)

*Primary Examiner* — Rami Khatib
*Assistant Examiner* — Gabriel Joseph Rene Lambert
(74) *Attorney, Agent, or Firm* — Lewis Roca Rothgerber Christie LLP

(57) ABSTRACT

A navigation system includes an operation input unit, a temporary storage unit, and a control unit that executes processing concerning the navigation operation using the information for applications. The control unit sets analysis priority levels for analysis processing performed for each of the kinds of the map information and sets generation priority levels for each of the kinds of the information for applications, performs, with at least one kind of map information as an analysis target, the analysis processing generates the information for applications in order according to the generation priority levels based on results of the analysis processing respectively obtained for the map information set as the analysis target, saves the generated information for applications in the temporary storage unit, and executes processing concerning the navigation operation using the information for applications saved in the temporary storage unit.

9 Claims, 14 Drawing Sheets

(56) References Cited

U.S. PATENT DOCUMENTS

| | | | | |
|---|---|---|---|---|
| 2009/0172031 A1* | 7/2009 | Moribe | ................ | G01C 21/32 |
| 2009/0187336 A1* | 7/2009 | Kawamata | ............ | G01C 21/32 |
| | | | | 701/532 |
| 2013/0174173 A1* | 7/2013 | Nagai | ...................... | G06F 9/52 |
| | | | | 718/103 |
| 2013/0261968 A1* | 10/2013 | Sakairi | ................... | G01C 21/34 |
| | | | | 701/533 |

OTHER PUBLICATIONS

International Search Report and Written Opinion of corresponding PCT/JP/2018/041534, dated Feb. 5, 2019 with English translation of ISR, 9 pages.

European communication for EP 18876687.7 dated Jun. 2, 2022, 13 pages.

* cited by examiner

FIG.4

| Generation Priority Level | Priority Level Setting Condition | | | | |
|---|---|---|---|---|---|
| | 201 MAP IS DISPLAYED ON SCREEN | 202 USER TOUCHES | 203 USER OPERATES UI OF ROUTE SEARCH FUNCTION | 204 ROUTE SEARCH PROCESSING IS COMPLETED | 205 DRIVING SUPPORT FUNCTION IS EFFECTIVE |
| 53 DRAWING INFORMATION FOR APPLICATIONS | B | B | D | C | - |
| 54 ROAD INFORMATION FOR APPLICATIONS | B | D | B | B | A |
| 55 POINT INFORMATION FOR APPLICATIONS | B | C | C | D | - |
| 56 GUIDANCE INFORMATION FOR APPLICATIONS | D | D | D | B | - |
| 57 DRIVING SUPPORT INFORMATION FOR APPLICATIONS | - | - | - | - | A |

FIG.5

| ANALYSIS PRIORITY LEVEL | PRIORITY LEVEL SETTING CONDITION | | | | |
|---|---|---|---|---|---|
| | MAP IS DISPLAYED ON SCREEN (201) | USER TOUCHES (202) | USER OPERATES UI OF ROUTE SEARCH FUNCTION (203) | ROUTE SEARCH PROCESSING IS COMPLETED (204) | DRIVING SUPPORT FUNCTION IS EFFECTIVE (205) |
| GEOGRAPHICAL FEATURE INFORMATION ANALYSIS (211) | C | C | D | D | C |
| ROAD INFORMATION ANALYSIS (212) | A | A | A | A | A |
| ICON INFORMATION ANALYSIS (213) | B | B | C | C | B |
| POINT INFORMATION ANALYSIS (214) | D | D | B | B | D |
| HIGH-ACCURACY MAP INFORMATION ANALYSIS (215) | - | - | - | - | B |

FIG. 6

| SETTING RANGE | PRIORITY LEVEL SETTING CONDITION | | | | |
|---|---|---|---|---|---|
| | 201 MAP IS DISPLAYED ON SCREEN | 202 USER TOUCHES | 203 USER OPERATES UI OF ROUTE SEARCH FUNCTION | 204 ROUTE SEARCH PROCESSING IS COMPLETED | 205 DRIVING SUPPORT FUNCTION IS EFFECTIVE |
| RANGE CONDITION | 401 MESHES WITHIN RADIUS OF ONE SHEET FROM DISPLAY CENTER | 402 MESHES WITHIN RADIUS OF ONE SHEET FROM DISPLAY CENTER AND MESHES IN TOUCH MOVING DIRECTION | 403 MESHES MATCHING ROUTE SEARCHED IN PAST AND MESHES MATCHING ROUTE HIGHLY LIKELY TO BE SEARCHED | 404 MESHES ON SEARCHED ROUTE ARE SET AS TARGETS | 405 MESHES TO WHICH ROAD ON WHICH OWN VEHICLE POSITION IS PRESENT IS CONNECTED |

FIG. 8

| MESH ID (700) | DRAWING INFORMATION FOR APPLICATIONS (51/52) | | ROAD INFORMATION FOR APPLICATIONS (53) | | POINT INFORMATION FOR APPLICATIONS (54) | | GUIDANCE INFORMATION FOR APPLICATIONS (55) | | DRIVING SUPPORT INFORMATION FOR APPLICATIONS (56) | |
|---|---|---|---|---|---|---|---|---|---|---|
| | GENERATION PRIORITY LEVEL | GENERATION STATE (701) | GENERATION PRIORITY LEVEL | GENERATION STATE | GENERATION PRIORITY LEVEL | GENERATION STATE | GENERATION PRIORITY LEVEL | GENERATION STATE | GENERATION PRIORITY LEVEL | GENERATION STATE |
| 4999 | B | GENERATED | D | GENERATED | C | UN-GENERATED | D | UN-GENERATED | - | UN-GENERATED |
| 5000 | B | UN-GENERATED | D | UN-GENERATED | C | UN-GENERATED | D | UN-GENERATED | - | UN-GENERATED |
| 5001 | B | UN-GENERATED | D | UN-GENERATED | C | UN-GENERATED | D | UN-GENERATED | - | UN-GENERATED |
| ... | ... | ... | ... | ... | ... | ... | ... | ... | ... | ... |

FIG.9

| MESH ID | GEOGRAPHICAL FEATURE INFORMATION ANALYSIS RESULT | | ROAD INFORMATION ANALYSIS RESULT | | ICON INFORMATION ANALYSIS RESULT | | POINT INFORMATION ANALYSIS RESULT | | HIGH-ACCURACY MAP INFORMATION ANALYSIS RESULT | |
|---|---|---|---|---|---|---|---|---|---|---|
| | ANALYSIS PRIORITY LEVEL | ANALYSIS STATE | ANALYSIS PRIORITY LEVEL | ANALYSIS STATE | ANALYSIS PRIORITY LEVEL | ANALYSIS STATE | ANALYSIS PRIORITY LEVEL | ANALYSIS STATE | ANALYSIS PRIORITY LEVEL | ANALYSIS STATE |
| 4999 | C | ANALYZED | A | ANALYZED | B | ANALYZED | D | UN-ANALYZED | - | UN-ANALYZED |
| 5000 | C | UN-ANALYZED | A | UN-ANALYZED | B | UN-ANALYZED | D | UN-ANALYZED | - | UN-ANALYZED |
| 5001 | C | UN-ANALYZED | A | UN-ANALYZED | B | UN-ANALYZED | D | UN-ANALYZED | - | UN-ANALYZED |
| ... | ... | ... | ... | ... | ... | ... | ... | ... | ... | ... |

FIG.12
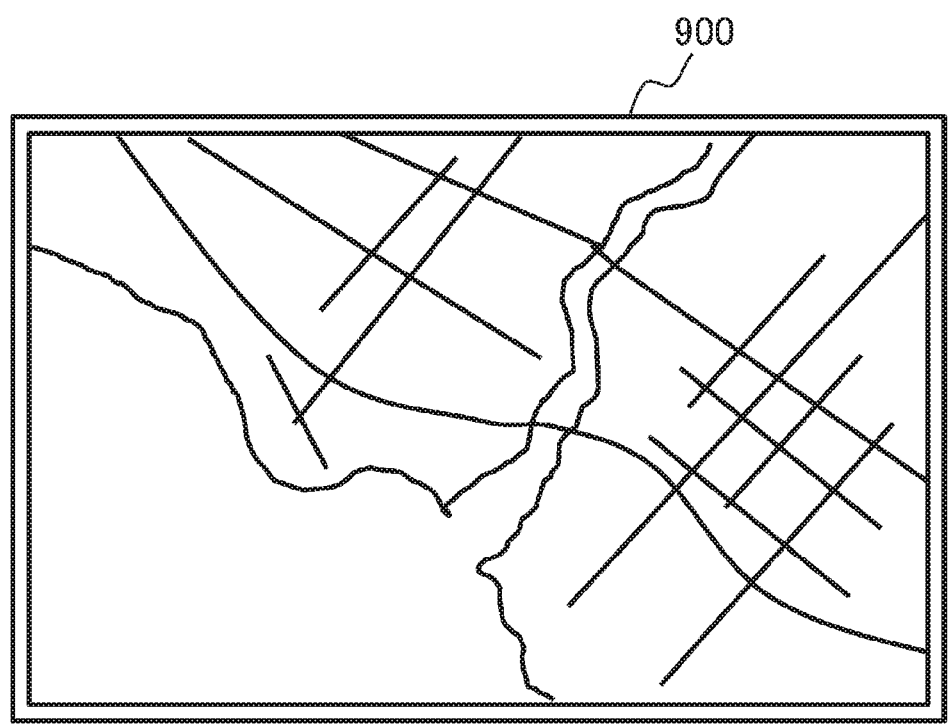
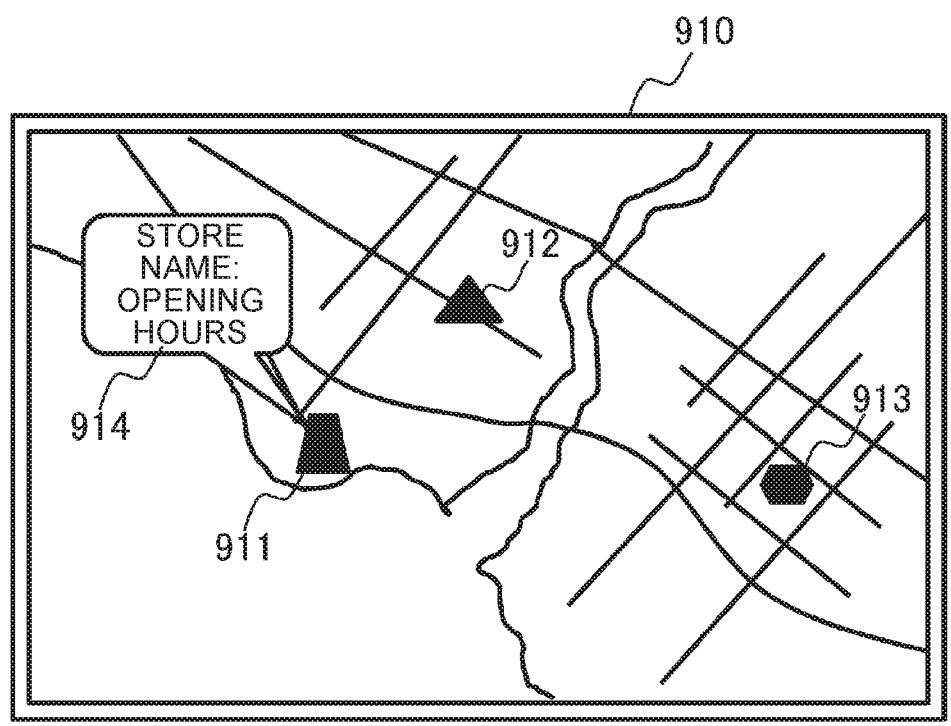

NAVIGATION SYSTEM AND NAVIGATION METHOD

CROSS-REFERENCE TO RELATED APPLICATIONS

This application is a U.S. National Phase Patent Application of International Application Number PCT/JP2018/041534, filed on Nov. 8, 2018, which claims priority to Japanese Patent Application Number 2017-217084, filed on Nov. 10, 2017, the entire contents of both of which are incorporated herein by reference.

TECHNICAL FIELD

The present invention relates to a navigation system and a navigation method.

BACKGROUND ART

A navigation system that presents a map using map data and performs guidance for a moving route has been widely used. Such a navigation system is requested to perform map drawing at high speed in scroll operation for the map, scale changing operation, and the like.

A technique described in Patent Literature 1 has been known concerning an increase in speed of map drawing. Patent Literature 1 discloses a map display device including a map database, operation receiving means, map-data acquiring means, map-data cache means, and map drawing means. When scroll operation for a map is received by the operation receiving means, the map-data acquiring means acquires, out of map data stored by the map database, map data capable of drawing of a map in a wider range than a map currently being displayed, the map data having the same scale as a scale of map data used for drawing the map currently being displayed. On the other hand, when the scroll operation for a map is not received by the operation receiving means, the map-data acquiring means acquires, out of the map data stored by the map database, map data capable of drawing a map in the same range as the range of the map currently being displayed, the map data being a plurality of map data having a scale different from the scale of the map data used for drawing the map data currently being displayed. The map-data cache means stores the map data acquired by the map-data acquiring means in an internal memory. The map drawing means draws a map using the map data stored in the internal memory.

CITATION LIST

Patent Literature

[Patent Literature 1] WO 2011/101895

SUMMARY OF INVENTION

Technical Problem

In general, a navigation system uses map data for purposes other than map drawing. Accordingly, it is possible to improve the performance of the navigation system by referring to the map data at high speed. However, in the technique described in Patent Literature 1, the map drawing is accelerated by determining, targeting only data concerning the map drawing among the map data, according to a state of the scroll operation, a range of map data to be acquired. Therefore, concerning map data unrelated to the map drawing, it is not considered that the map data is referred to at high speed. Map data such as link data of roads unrelated to map drawing also needs to be often referred to for a route search. In a method for performing map drawing at high speed, it is not considered that map data for a route search is referred to at this speed. Therefore, the method does not contribute to an increase in speed of the route search. An object of the present invention is an increase in speed of reference to map data not limited to a specific map data type.

Solution to Problem

A navigation system according to the present invention is a navigation system that performs a navigation operation for guiding a mobile body using map data formed by a plurality of kinds of map information, the navigation system including: an operation input unit to which operation information according to operation by a user is input; a temporary storage unit capable of temporarily storing information; and a control unit that generates a plurality of kinds of information for applications based on the map data and executes processing concerning the navigation operation using the information for applications. The control unit sets, based on at least one of the operation information and a state of the navigation operation, analysis priority levels for analysis processing performed for each of the kinds of the map information and sets generation priority levels for each of the kinds of the information for applications, performs, with at least one kind of map information among the plurality of kinds of map information set as an analysis target, the analysis processing in order according to the analysis priority levels, generates the information for applications in order according to the generation priority levels based on results of the analysis processing respectively obtained for the map information set as the analysis target, saves the generated information for applications in the temporary storage unit, and executes processing concerning the navigation operation using the information for applications saved in the temporary storage unit.

A navigation method according to the present invention is a navigation method for performing a navigation operation for guiding a mobile body using map data formed by a plurality of kinds of map information, the navigation method including: setting, based on at least one of operation information according to operation by a user who receives provision of the navigation operation and a state of the navigation operation, analysis priority levels for analysis processing performed by a computer for each of the kinds of the map information and setting generation priority levels for each of kinds of information for applications used by the computer for execution of processing concerning the navigation operation; the computer performing, with at least one kind of map information among the plurality of kinds of map information set as an analysis target, the analysis processing in order according to the analysis priority levels; the computer generating the information for applications in order according to the generation priority levels based on results of the analysis processing respectively obtained for the map information set as the analysis target; the computer temporarily storing the generated information for applications; and the computer executing processing concerning the navigation operation using the temporarily stored information for applications.

Advantageous Effects of Invention

According to the present invention, it is possible to refer to map data in a navigation system at high speed.

Problems, configurations, and effects other than those explained above are clarified by the following explanation of embodiments.

BRIEF DESCRIPTION OF DRAWINGS

FIG. 4 is a generation priority level table showing a setting example of generation priority levels.

FIG. 5 is an analysis priority level table showing a setting example of analysis priority levels.

FIG. 6 is a priority level setting range table showing an example of setting ranges of the analysis priority levels and the generation priority levels.

FIG. 8 is a cache data management table showing an example in which the generation priority levels are set for each of meshes.

FIG. 9 is an analysis data management table showing an example in which the analysis priority levels are set for each of the meshes.

FIG. 12 is a diagram showing examples of a map screen.

DESCRIPTION OF EMBODIMENTS

Embodiments of the present invention are explained below with reference to the drawings.

First Embodiment

Figure 1:
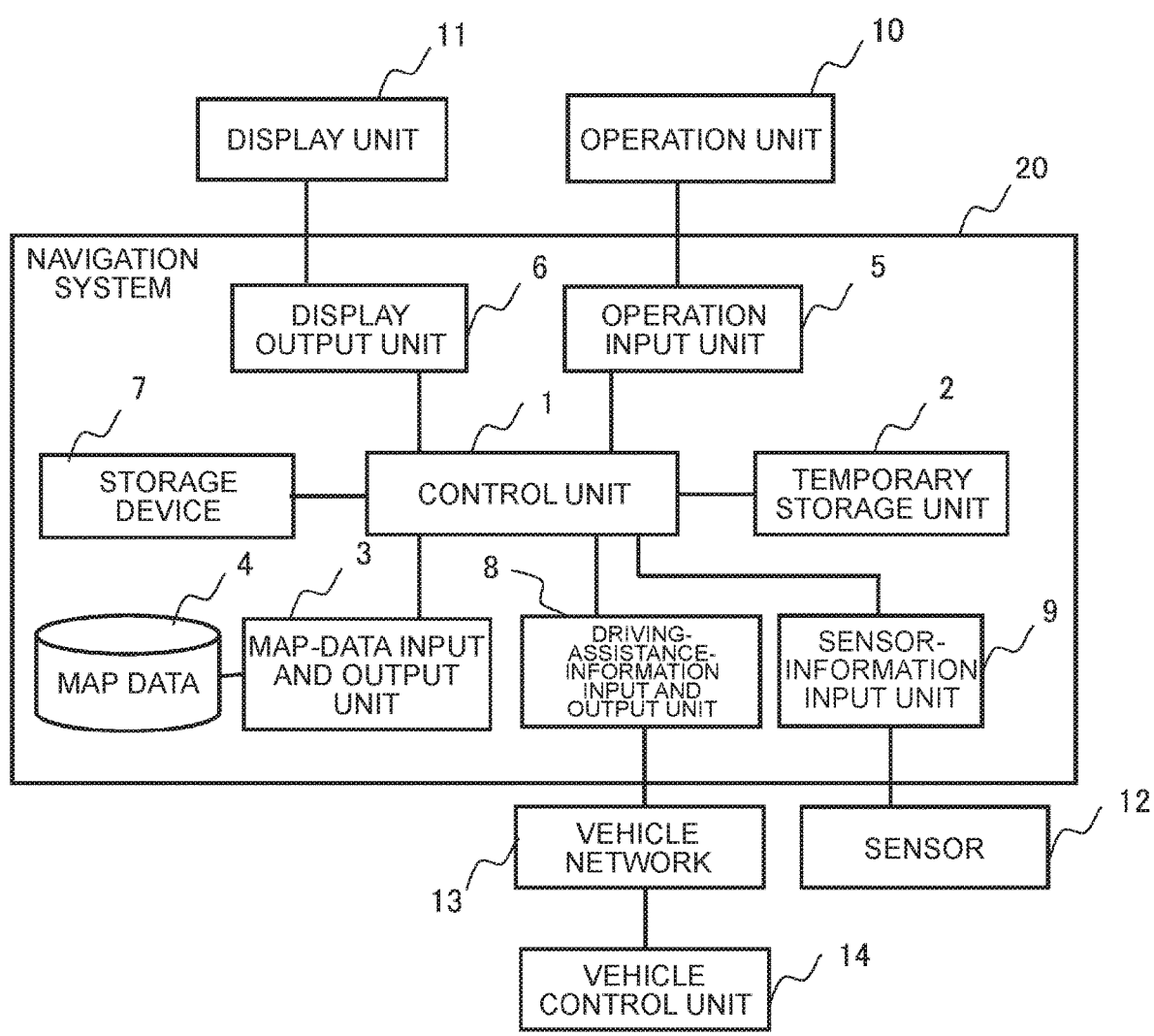
FIG. 1 is a configuration diagram of a navigation system according to a first embodiment of the present invention.

FIG. 1 is a configuration diagram of a navigation system according to a first embodiment of the present invention. A navigation system 20 shown in FIG. 1 is mounted on a vehicle, which is a mobile body, and used and performs a navigation operation for guiding the vehicle to a destination. Note that, in the following explanation, the vehicle on which the navigation system 20 is mounted is referred to as "own vehicle". The navigation system 20 includes a control unit 1, a temporary storage unit 2, a map-data input and output unit 3, map data 4, an operation input unit 5, a display output unit 6, a storage device 7, a driving-assistance-information input and output unit 8, and a sensor-information input unit 9. The navigation system 20 is connected to an operation unit 10, a display unit 11, a sensor 12, and a vehicle network 13.

The control unit 1 is a microcomputer that executes various programs stored in the storage device 7 to execute processing concerning the navigation operation and perform control of the portions of the navigation system 20. The control unit 1 is configured using a processor such as a CPU.

The temporary storage unit 2 is an area where digital information readable and writable at high speed can be stored. The temporary storage unit 2 is used as a work area when the control unit 1 performs processing. The temporary storage unit 2 is configured using a memory such as a RAM.

The map-data input and output unit 3 reads and acquires necessary data from the map data 4 according to the control by the control unit 1 and outputs the data to the control unit 1. The map data 4 is formed by a plurality of kinds of map information, for example, geographical feature information and road information and recorded in a nonvolatile memory such as a flash memory, a hard disk, or a memory card. That is, the map-data input and output unit 3 is an interface device that performs reading from and writing in the nonvolatile memory.

Note that the plurality of kinds of map information stored in the map data 4 are respectively formed by data sets in rectangular mesh units finely divided for each of predetermined distance intervals in the latitude direction and the longitude direction and data rows including addresses and coordinates as keys. In order to represent information different according to a scale of a map, the number of divisions of meshes is different according to the scale.

The operation unit 10 detects operation performed by an occupant of the own vehicle, who is a user of the navigation system 20, and outputs operation information according to content of the operation to the navigation system 20. The operation unit 10 is configured by, for example, a touch panel, a button, a mouse, or a keyboard. The operation information output from the operation unit 10 is input to the operation input unit 5 and transmitted to the control unit 1 in the navigation system 20. That is, the operation input unit 5 is an interface that inputs and outputs information between the control unit 1 and the operation unit 10. For example, when the operation unit 10 is a touch panel, the touch panel detects a motion of a finger of the user and outputs the motion as an electric signal. A circuit that receives the electric signal is equivalent to the operation input unit 5.

The display unit 11 receives a video signal output from the display output unit 6 and performs screen display to present information necessary for a navigation operation such as a map image to the user of the navigation system 20. The display unit 11 is configured by, for example, a liquid crystal display. The display output unit 6 generates a video signal based on video information output from the control unit 1 and outputs the video signal to the display unit 11. That is, the display output unit 6 is an interface that inputs and outputs information between the control unit 1 and the display unit 11. The display output unit 6 is equivalent to a circuit for video signal generation. Note that the display unit 11 may be configured as a touch panel to integrate the display unit 11 and the operation unit 10.

The storage device 7 is a nonvolatile storage medium that records a program executed in the control unit 1 to realize processing concerning the navigation operation and various data used during the execution of the program. The storage device 7 is configured using a nonvolatile memory such as a flash memory, a hard disk, or a memory card.

The vehicle control unit 14 performs traveling control for the own vehicle based on driving operation of a driver and detection information of various sensors. The vehicle control unit 14 is connected to the navigation system 20 via the vehicle network 13 provided in the own vehicle. The driving-assistance-information input and output unit 8 transmits and receives, according to the control by the control unit 1, information concerning driving to and from the vehicle control unit 14 via the vehicle network 13. That is, the driving-assistance-information input and output unit 8 is an interface that inputs and outputs information between the control unit 1 and the vehicle control unit 14. For example, when the vehicle control unit 14 performs control for assisting steering operation, acceleration operation, brake operation, and the like and automatic driving control, the driving-assistance-information input and output unit 8 outputs position information of the own vehicle, road information acquired from the map data 4, and the like to the vehicle control unit 14. For example, when vehicle speed information, operation information of an interior air conditioning device, video information acquired by an exterior camera, and the like are provided from the vehicle control unit 14, the driving-assistance-information input and output unit 8 receives these kinds of information from the vehicle control unit 14 via the vehicle network 13 and outputs the information to the control unit 1. Note that the driving-assistance-information input and output unit 8 may be realized as a function of the same processor as the control unit 1 or, for example, when outputting important information concerning driving of the own vehicle, may be realized as a processor independent from the control unit 1 in order to guarantee fault tolerance.

The sensor 12 detects various kinds of sensor information necessary for the navigation operation and presents the sensor information to the navigation system 20. The sensor 12 is configured by a position sensor realized using, for example, a reception antenna of a global positioning satellite system, an acceleration sensor, a gyro sensor, an obstacle sensor, or the like. The sensor information output from the sensor 12 is input to the sensor-information input unit 9 and transmitted to the control unit 1 in the navigation system 20. That is, the sensor-information input unit 9 is an interface that inputs and outputs the sensor information between the control unit 1 and the sensor 12.

Figure 2:
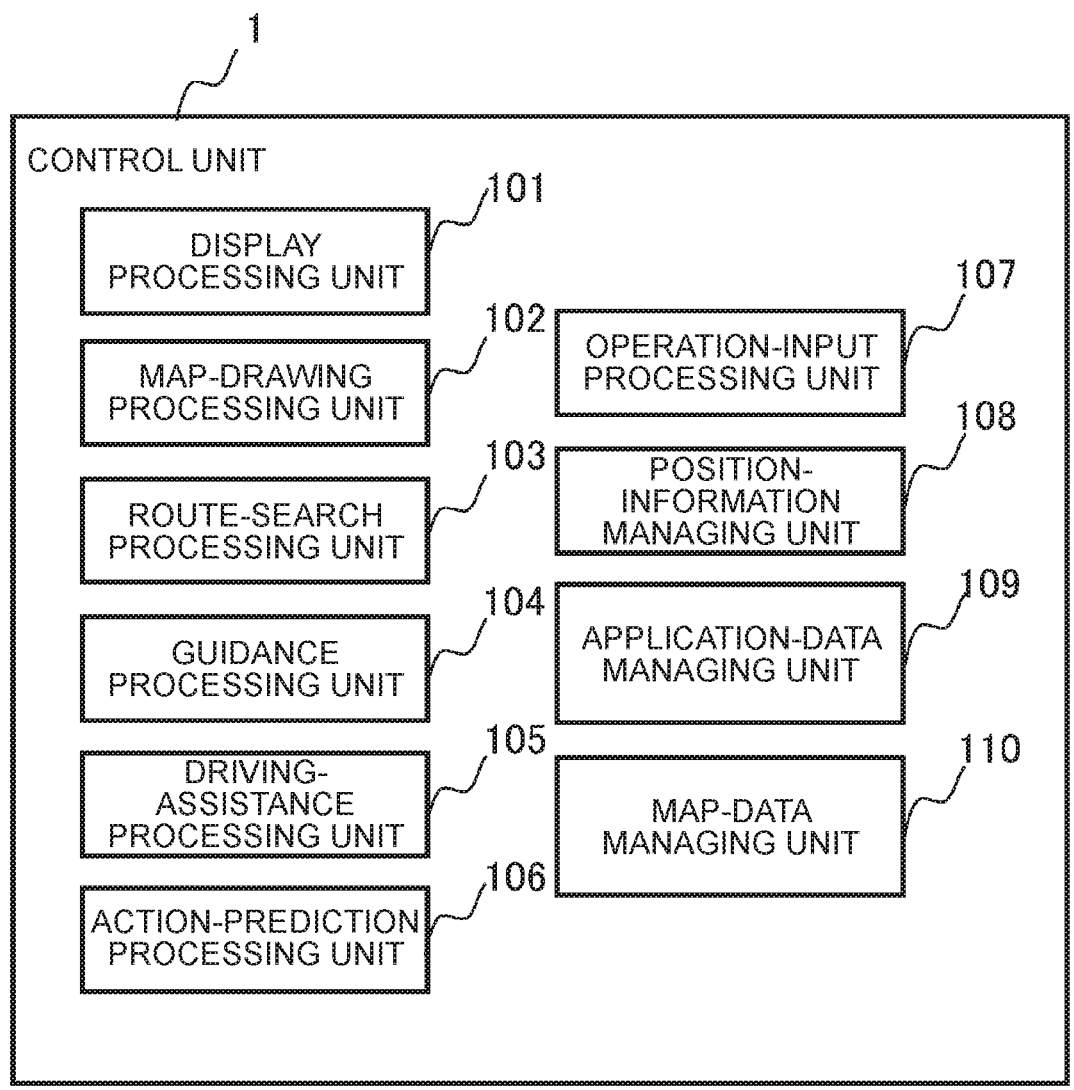
FIG. 2 is a diagram showing a functional configuration of a control unit.

FIG. 2 is a diagram showing an example of a functional configuration of the control unit 1. As shown in FIG. 2, the control unit 1 includes, as functions thereof, units such as a display processing unit 101, a map-drawing processing unit 102, a route-search processing unit 103, a guidance processing unit 104, a driving-assistance processing unit 105, an action-prediction processing unit 106, an operation-input processing unit 107, a position-information managing unit 108, an application-data managing unit 109, and a map-data managing unit 110. These functions are realized as modules (hereinafter referred to as applications) of software executed by the control unit 1.

Depending on a realizing method, the applications may be realized as a combination of applications obtained by integrating a plurality of functions. In the following explanation, applications used on the inside by the control unit 1 to realize the functions are illustrated. However, this does not limit a method of configuring applications.

The display processing unit 101 performs processing for generating video information referring to processing results of other applications and sending the generated video information to the display output unit 6.

The map-drawing processing unit 102 performs processing for drawing a map based on map data sent from the map-data input and output unit 3 and sending the map to the display processing unit 101.

The route-search processing unit 103 performs processing for, referring to the map data sent from the map-data input and output unit 3, calculating a route for the own vehicle to reach a designated destination.

The guidance processing unit 104 performs processing for creating, based on information concerning the route calculated by the route-search processing unit 103 and present position information of the own vehicle managed by the position-information managing unit 108, guidance information for guiding the own vehicle to the destination according to the route. The guidance processing unit 104 creates, as guidance information, using, for example, map data sent from the map-data input and output unit 3 and managed by the application-data managing unit 109 and prediction information concerning a traveling direction of the own vehicle retained by the action-prediction processing unit 106, information for informing the driver of roads, buildings, traffic states, and the like ahead of traveling of the own vehicle. The guidance information created by the guidance processing unit 104 is sent to the display processing unit 101.

The driving-assistance processing unit 105 generates driving assistance information necessary for the operation of the vehicle control unit 14 referring to the information concerning the route calculated by the route-search processing unit 103 and the map data sent from the map-data input and output unit 3 and managed by the application-data managing unit 109. The driving assistance information generated by the driving-assistance processing unit 105 is sent to the driving-assistance-information input and output unit 8.

The action-prediction processing unit 106 performs processing for predicting a traveling direction, a destination, and the like of the own vehicle using past driving history information of the driver.

The operation-input processing unit 107 performs processing for analyzing the operation information received by the operation input unit 5 to determine operation content of the user and starting or stopping the processing of the other applications according to the operation content.

The position-information managing unit 108 calculates a present position, a traveling direction, traveling speed, and the like of the own vehicle based on the information acquired by the sensor-information input unit 9.

The application-data managing unit 109 performs processing for managing information required by the other applications.

The map-data managing unit 110 performs processing for managing the map data sent from the map-data input and output unit 3.

Note that the map-data managing unit 110 analyzes various kinds of map information included in the map data sent from the map-data input and output unit 3 and generates, based on a result of the analysis, information for applications used for processing of the applications. The application-data managing unit 109 manages the information for applications generated by the map-data managing unit 110 and provides the information for applications to the applications according to necessity. Details of this processing is explained below.

Figure 3:
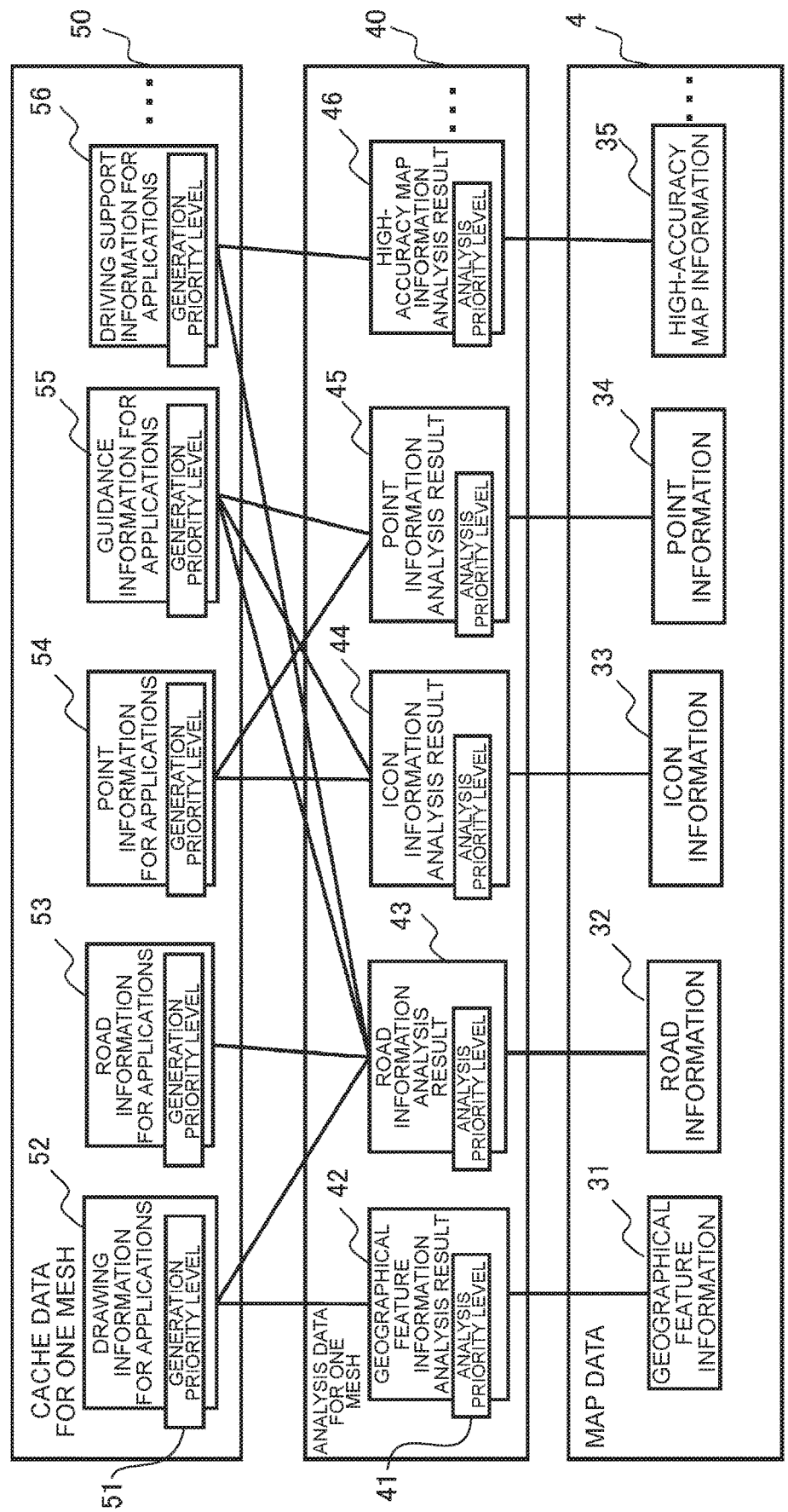
FIG. 3 is a diagram showing an example of a relation between an analysis result of map information and information for applications.

FIG. 3 is a diagram showing a relation between the analysis result of the map information and the information for applications. As shown in FIG. 3, the control unit 1 analyzes the map data 4 with the processing by the map-data managing unit 110 and generates analysis data 40 corresponding to a result of the analysis. The control unit 1 extracts information required by the applications from the analysis data 40 to generate information for applications, saves the information for applications in the temporary storage unit 2 as cache data 50. The application-data managing unit 109 manages the information for applications.

The map data 4 includes map information such as geographical feature information 31, road information 32, icon information 33, point information 34, and high-accuracy map information 35. The geographical feature information 31 is coordinate point data indicating shapes of buildings and shapes of geographical features. The road information 32 is information concerning features such as topologies of roads, shapes of the roads, and lengths of the roads. The icon information 33 is information indicating icons concerning target objects such as buildings and is stored using coordinate information as a key. The point information 34 is information concerning addresses and features concerning buildings and places and is stored using coordinate information as a key. The point information 34 also includes, for example, information concerning tollgates. The high-accuracy map information 35 is information representing shapes of roads with higher accuracy than the road information 32. These kinds of map information are respectively stored in the map data 4 in mesh units. Note that the map data 4 may include other map information.

The analysis data 40 includes analysis results such as a geographical feature information analysis result 42, a road information analysis result 43, an icon information analysis result 44, a point information analysis result 45, and a high-accuracy map information analysis result 46. These analysis results respectively correspond to the geographical feature information 31, the road information 32, the icon information 33, the point information 34, and the high-accuracy map information 35 of the map data 4. The analysis results are stored in the temporary storage unit 2 in a state in which the analysis results can be referred to at high speed.

The geographical feature information analysis result 42 is information indicating a results obtained by the control unit 1 analyzing the geographical feature information 31 with a map-data managing unit 19. The road information analysis result 43 is information indicating a result obtained by the control unit 1 analyzing the road information 32 with the map-data managing unit 19. The icon information analysis result 44 is information indicating a result obtained by the control unit 1 analyzing the icon information 33 with the map-data managing unit 19. The point information analysis result 45 is information indicating a result obtained by the control unit 1 analyzing the point information 34 with the map-data managing unit 19. The high accuracy map information analysis result 46 is information indicating a result obtained by the control unit 1 analyzing the high-accuracy map information 35 with the map-data managing unit 19. Analysis priority levels 41 are respectively set for these analysis results. Note that, when the map data 4 includes other map information, the analysis data 40 may include other analysis results according to the map information.

Since a variety of types are present as formats of data retained by the map data 4, the map data 4 is not always in a form optimum for use by the applications. When the map data 4 is in a form suitable for use in the applications, analysis processing for creating the analysis data 40 is, for example, processing for simply copying necessary data from the map data 4. The analysis processing requires a negligible time. However, when the map data 4 is not in a form suitable for use in the applications, it is necessary to create the analysis data 40 such that the control unit 1 can refer to content of the analysis data 40. Therefore, the analysis processing requires a long time. Measures for, for example, caching and reusing the analysis data 40 are sometimes necessary.

Therefore, in this embodiment, in order to solve the problems described above, the analysis priority levels 41 are set for the analysis processing performed for each of the kinds of the map information. The analysis processing for the kinds of map information is performed in order according to the analysis priority levels 41 to obtain an analysis result. Note that a setting method for the analysis priority levels 41 and a specific procedure in performing the analysis processing in the order according to the analysis priority levels 41 are explained below.

The cache data 50 includes information for applications such as drawing information for applications 52, road information for applications 53, point information for applications 54, guidance information for applications 55, and driving support information for applications 56. These kinds of information for applications are stored in, separately from the analysis results of the analysis data 40, the temporary storage unit 2 in a state in which the information for applications can be referred to at high speed.

The drawing information for applications 52 is information for applications necessary for map drawing processing or the like performed by the map-drawing processing unit 102. The drawing information for applications 52 includes, for example, coordinate point data indicating shapes of buildings and shapes of geographical features and data indicating shapes of roads. The drawing information for applications 52 is formed by combining the geographical feature information analysis result 42 and the road information analysis result 43.

The road information for applications 53 is information for applications necessary for route search processing or the like performed by the route-search processing unit 103. The road information for applications 53 includes, for example, information indicating in what kind of topology roads are connected and information concerning features of roads such as lengths of the roads, one-way traffic, speed control, and time period control. The road information for applications 53 are formed based on the road information analysis result 43.

The point information for applications 54 is information for applications necessary for display of various facility icons in the map drawing processing performed by the map-drawing processing unit 102, a search for a destination in the route search processing performed by the route-search processing unit 103, and the like. The point information for applications 54 includes, for example, detailed information such as addresses and features concerning buildings and places in various districts and information indicating icons of various facilities. The point information for applications 54 is formed by combining the icon information analysis result 44 and the point information analysis result 45. Note that, when processing is complicated if all the kinds of information included in these analysis results are used in the applications, the control unit 1 may curtail unnecessary information and generate the point information for applications 54.

The guidance information for applications 55 is information for applications necessary for guidance and the like for the own vehicle performed by the guidance processing unit 104. The guidance information for applications 55 includes, for example, information such as icons of facilities serving as marks on a route and tollgates that the route passes. The guidance information for applications 55 is formed by combining the road information analysis result 43, the icon information analysis result 44, and the point information analysis result 45. Note that, when generating the guidance information for applications 55, the control unit 1 may perform, referring to the road information analysis result 43, integration of the applications suitable for processing, for example, for enabling cross-reference to IDs of target roads and information concerning ions and points related in the icon information analysis result 44 and the point information analysis result 45.

The driving support information for applications 56 is information for applications necessary for, for example, generation of driving assistance information performed by the driving-assistance processing unit 105. The driving support information for applications 56 includes, for example, information indicating a shape of a road on which the own vehicle is traveling. The driving support information for applications 56 is formed by combining the road information analysis result 43 and the high-accuracy map information analysis result 46. Note that, when generating the driving support information for applications 56, the control unit 1 may perform, referring to the road information analysis result 43, integration of the applications suitable for processing, for example, for enabling cross-reference to IDs of target roads and information concerning road shapes related in the road information analysis result 43 and the high-accuracy map information analysis result 46.

Generation priority levels 51 are respectively set for the kinds of information for applications included in the cache data 50. Note that information for applications included in the cache data 50 is not limited to the information for applications explained above. The cache data 50 may include other information for applications.

The kinds of information for applications forming the cache data 50 are formed in a form appropriate for use in the applications. That is, a format of the kinds of information for applications is designed prioritizing easiness of processing in the applications. Accordingly, it is difficult to generate the kinds of information for applications directly using the analysis data 40. To create information necessary in the kinds of information for applications, it is sometimes necessary to refer to a plurality of analysis results in the analysis data 40. Therefore, it takes time to generate the information for applications.

Therefore, in this embodiment, in order to solve the problems described above, the generation priority levels 51 are set for the kinds of information for applications. The kinds of information for applications are generated in order according to the generation priority levels 51. Note that a setting method for the generation priority levels 51 and a specific procedure in generating the information for applications in order according to the generation priority levels 51 are explained below.

Among the applications shown in FIG. 2 executed in the control unit 1, concerning applications that refer to the information for applications included in the cache data 50, an example of relationship between the applications and the information for applications is explained below.

The map-drawing processing unit 102 draws a map referring to the drawing information for applications 52 and the point information for applications 54. In drawing a map, the map-drawing processing unit 102 draws an icon, which is superimposed and displayed on the map, using the point information for applications 54. Note that, when drawing a map, it is desirable to preferentially draw information concerning roads and geographical features. In that case, icons are sometimes displayed late during scrolling of the map.

The route-search processing unit 103 searches for a route to a destination referring to the road information for applications 53 and the point information for applications 54. When searching for a route to a destination, the route-search processing unit 103 may present information concerning destinations to the user of the navigation system 20 referring to the point information for applications 54 to cause the user to designate a destination and may perform a route search to the designated destination using the road information for applications 53.

The guidance processing unit 104 performs guidance to a destination following a route referring to the road information for applications 53, the point information for applications 54, and the guidance information for applications 55. When performing the guidance, the guidance processing unit 104 generates guidance information referring to the feature information of the roads in the road information for applications 53, information respectively indicated by the point information for applications 54 and the guidance information for applications 55, and the like using, as keys, information concerning the present position of the own vehicle acquired by the sensor-information input unit 9 and IDs of roads set as targets of the guidance. Note that at least the guidance information for applications 55 is necessary for the generation of guidance information. The road information for applications 53 and the point information for applications 54 are not essential. Therefore, delay in acquisition of these kinds of information for applications may be admitted.

The driving-assistance processing unit 105 generates driving assistance information used in the vehicle control unit 14 referring to the road information for applications 53 and the driving support information for applications 56. When generating driving assistance information, the driving-assistance processing unit 105 refers to the feature information of the roads in the road information for applications 53, the high-accuracy information concerning the roads in the driving support information for applications 56, and the like using, as keys, IDs of roads set as targets of driving support and combines these kinds of information to generate driving assistance information.

Note that the relationship between the applications and the information for applications explained above is an example. Therefore, relationship between the applications and the information for applications is not limited to this. It is possible to optionally decide, according to processing contents of the applications and contents of the kinds of information for applications, which applications use which information for applications.

As explained above, the control unit 1 performs the analysis processing respectively for the kinds of map information forming the map data 4 to acquire the analysis data 40 including the analysis results such as the geographical feature information analysis result 42, the road information analysis result 43, the icon information analysis result 44, the point information analysis result 45, and the high-accuracy map information analysis result 46. The control unit 1 generates the kinds of information for applications such as the drawing information for applications 52, the road information for applications 53, the point information for applications 54, the guidance information for applications 55, and the driving support information for applications 56 based on these analysis results and saves the information for applications in the temporary storage unit 2 as the cache data 50. The map-data managing unit 110 performs processing concerning generation of the cache data 50. The control unit 1 executes processing concerning the navigation operation using the kinds of information for applications saved in the temporary storage unit 2 in this way.

Next, a setting method for the analysis priority levels 41 and the generation priority levels 51 is explained. The control unit 1 sets the analysis priority levels 41 for the analysis processing performed for each of the kinds of map information and sets the generation priority levels 51 for the kinds of information for applications of the cache data 50 based on operation information input to the operation input unit 5 from the operation unit 10 and a state of the navigation operation in the navigation system 20. The map-data managing unit 110 in the control unit 1 performs setting processing for the analysis priority levels 41 and the generation priority levels 51.

FIG. 4 is a generation priority level table showing a setting example of the generation priority levels 51. The generation priority level table of FIG. 4 shows a setting example of the generation priority levels 51 for the kinds of information for applications with respect to each of setting conditions 201 to 205. Values of the generation priority levels 51 are represented in four stages of A, B, C, and D concerning the kinds of information for applications such as the drawing information for applications 52, the road information for applications 53, the point information for applications 54, the guidance information for applications 55, and the driving support information for applications 56 shown in FIG. 3. It is assumed that priority levels for generation of the information for applications are high in the order of A, B, C, and D. That is, the information for applications, the value of the generation priority levels 51 of which is A, has the highest generation priority level. Note that, in FIG. 4, the values of the generation priority levels 51 are represented in four stages but are not limited to the four stages. Items represented as "-" in the generation priority level table of FIG. 4 indicate that the items are excluded from setting targets of the generation priority levels 51. At this time, when values of the generation priority levels 51 are already set according to another setting condition, the values of the generation priority levels 51 may be maintained without being overwritten and may be continuously used.

The control unit 1 determines, based on the operation information input to the operation input unit 5 from the operation unit 10 and the present state of the navigation operation, to which of the setting conditions 201 to 205 in FIG. 4 are satisfied. For example, when the operation unit 10 is configured by a touch panel and operation information indicating that the user touches the touch panel is input, the control unit 1 determines the setting condition 202 is satisfied and sets, for the kinds of information for applications, the generation priority levels 51 corresponding to the setting condition 202 as follows.

The control unit 1 sets the generation priority level 51 for the drawing information for applications 52 in the setting condition 202 to "B". That is, in this case, the user is considered to be performing touch operation in order to scroll a map screen displayed on the touch panel. Accordingly, the control unit 1 sets "B", which is a rather high priority level, as a value of the generation priority level 51 for the drawing information for applications 52 necessary for the map-drawing processing unit 102 to perform map drawing processing.

On the other hand, the control unit 1 sets the generation priority level 51 for the point information for applications 54 in the setting condition 202 to "C". That is, an icon superimposed on a map may be displayed late during the scrolling of the map screen. Accordingly, the control unit 1 sets "C", which is a priority level lower than the priority level of the drawing information for applications 52, as a value of the generation priority level 51 for the point information for applications 54 necessary for the map-drawing processing unit 102 to perform icon drawing processing.

The control unit 1 sets the generation priority levels 51 for the road information for applications 53 and the guidance information for applications 55 in the setting condition 202 respectively to "D". That is, the route search performed by the route-search processing unit 103 and the guidance to a destination performed by the guidance processing unit 104 are not directly related to the scrolling of the map screen but are likely to be executed after the scrolling. Accordingly, the control unit 1 sets "D", which is a priority level lower than the priority levels of the drawing information for applications 52 and the point information for applications 54, as values of the generation priority levels 51 for the road information for applications 53 and the guidance information for applications 55 necessary for these kinds of processing.

Further, the control unit 1 excludes, from setting targets, the generation priority level 51 for the driving support information for applications 56 in the setting condition 202. That is, the generation of driving assistance information performed by the driving-assistance processing unit 105 is unrelated to the scrolling of the map screen. Accordingly, the control unit 1 excludes, from the setting targets of the generation priority levels 51, the driving support information for applications 56 used for the generation of the driving assistance information.

For example, when a driving support function is effective in the navigation system 20 and the vehicle control unit 14 is performing traveling control for the own vehicle using the driving assistance information generated by the driving-assistance processing unit 105, the control unit 1 determines that the setting condition 205 is satisfied and sets the generation priority level 51 corresponding to the setting condition 205 as follows for the kinds of information for applications.

The control unit 1 sets the generation priority levels 51 for the road information for applications 53 and the driving support information for applications 56 in the setting condition 205 to "A". That is, in this case, the traveling control for the own vehicle by the vehicle control unit 14 is considered to relate to safety and have higher importance than the other processing. Accordingly, the control unit 1 sets "A", which is the highest priority level, as values of the generation priority levels 51 for the road information for applications 53 and the driving support information for applications 56 used by the driving-assistance processing unit 105 to generate driving assistance information necessary in the vehicle control unit 14.

On the other hand, the control unit 1 excludes, from the setting targets, the generation priority levels 51 for the drawing information for applications 52, the point information for applications 54, and the guidance information for applications 55 in the setting condition 205. That is, processing performed using these kinds of information for applications is unrelated to the operation of the vehicle control unit 14. Accordingly, the control unit 1 excludes these kinds of information for applications from the setting targets of the generation priority levels 51.

Note that the values of the generation priority levels 51 shown in the generation priority level table of FIG. 4 are examples. Values of the generation priority levels 51 set for the kinds of information for applications of the cache data 50 are not limited to this. For example, when a certain setting condition is satisfied, a value of the generation priority level 51 is set high for the information for applications at least necessary for completing processing of an application directly related to the setting condition. On the other hand, a value of the generation priority level 51 is set relatively low for information for applications estimated as being necessary for completing nearest processing of an application but not immediately necessary. A value of the generation priority level 51 is set low for information for applications not directly related to the setting condition but likely to be necessary in future depending on operation content of the user and a state of the navigation operation. Further, information for applications concerning a function not deriving from the setting condition is excluded from the setting targets of the generation priority levels 51. Existing values of the generation priority levels 51 are not particularly operated. In this way, values of the generation priority levels 51 set for the kinds of information for applications can be determined.

FIG. 5 is an analysis priority level table showing a setting example of the analysis priority levels 41. The analysis priority level table of FIG. 5 shows a setting example of the analysis priority levels 41 for each of the setting conditions 201 to 205. As in the generation priority level table of FIG. 4, values of the analysis priority levels 41 are represented in four stages of A, B, C, and D concerning kinds of analysis processing such as a geographical feature information analysis 211, a road information analysis 212, an icon information analysis 213, a point information analysis 214, and a high-accuracy map information analysis 215. The kinds of analysis processing such as the geographical feature information analysis 211, the road information analysis 212, the icon information analysis 213, the point information analysis 214, and the high-accuracy map information analysis 215 are processing for respectively analyzing, in mesh units, the kinds of map information shown in FIG. 3, that is, the geographical feature information 31, the road information 32, the icon information 33, the point information 34, and the high-accuracy map information 35 and respectively acquiring the geographical feature information analysis result 42, the road information analysis result 43, the icon information analysis result 44, the point information analysis result 45, and the high-accuracy map information analysis result 46. Items represented as "-" in the analysis priority level table of FIG. 5 indicates that the items are excluded from the setting targets of the analysis priority levels 41. Further, the setting conditions 201 to 205 are the same as the setting conditions 201 to 205 of the generation priority level table of FIG. 4. Note that the values of the analysis priority levels 41 are represented in the four stages in FIG. 5 but are not limited to the four stages. Fineness of the values of the analysis priority levels 41 and fineness of the values of the generation priority levels 51 do not need to be the same and can be respectively set in any numbers of stages.

For example, in the cases of all the setting conditions, the control unit 1 sets the analysis priority levels 41 for the road information analysis 212 respectively to "A". That is, since the road information analysis result 43 is used in generation of various kinds of information for applications, a frequency of reference to the road information analysis result 43 is high. When the setting condition 205 is satisfied, the traveling control for the own vehicle relating to safety is processing with high importance. The road information analysis result 43 is necessary for generation of the road information for applications 53 and the driving support information for applications 56 used when the vehicle control unit 14 performs the traveling control. Accordingly, the control unit 1 sets "A", which is the highest priority level, for the road information analysis 212 corresponding to the road information analysis result 43 as a value of the analysis priority level 41.

On the other hand, the control unit 1 excludes, from the setting targets, the analysis priority levels 41 for the high-accuracy map information analysis 215 in the setting conditions other than the setting condition 205. That is, the high-accuracy map information analysis result 46 is necessary only in the case of the setting condition 205 in which the driving support function is effective in the navigation system 20 and is unnecessary in other cases. Accordingly, the control unit 1 sets "B", which is a high priority level, for the high-accuracy map information analysis 215 corresponding to the high-accuracy map information analysis result 46 as a value of the analysis priority level 41 in the case of the setting condition 205. The control unit 1 excludes the analysis priority level 41 of the high-accuracy map information analysis 215 from the setting targets of the analysis priority levels 41 in other cases.

Note that the values of the analysis priority levels 41 shown in the analysis priority level table of FIG. 5 are examples. The Values of the analysis priority levels 41 set for the kinds of analysis processing corresponding to the analysis results of the analysis data 40 are not limited to this. For example, a value of the analysis priority level 41 is set high for analysis processing for obtaining an analysis result highly likely to be referred to from a large number of applications in common. For analysis processing for obtaining an analysis result referred to from an application having particularly high importance in a certain setting condition, a value of the analysis priority level 41 in the setting condition is set high. In this way, it is possible to determine values of the analysis priority levels 41 set for the kinds of analysis processing.

Next, a determining method for a map range for setting the analysis priority levels 41 and the generation priority levels 51 is explained. As explained above, the kinds of map information are analyzed in mesh units in the kinds of analysis processing such as the geographical feature information analysis 211, the road information analysis 212, the icon information analysis 213, the point information analysis 214, and the high-accuracy map information analysis 215. Specifically, the control unit 1 determines, based on the operation information input to the operation input unit 5 from the operation unit 10 and a state of the navigation operation in the navigation system 20, in mesh units, a map range set as a target of the analysis processing. The control unit 1 analyzes the kinds of map information corresponding to the mesh to acquire the analysis results such as the geographical feature information analysis result 42, the road information analysis result 43, the icon information analysis result 44, the point information analysis result 45, and the high-accuracy map information analysis result 46 for the mesh. Further, the control unit 1 generates, based on the acquired analysis results, the kinds of information for applications such as the drawing information for applications 52, the road information for applications 53, the point information for applications 54, the guidance information for applications 55, and the driving support information for applications 56 for the mesh. Accordingly, setting ranges of the analysis priority levels 41 and the generation priority levels 51 are also set in mesh units according to the map range set as the target of the analysis processing.

FIG. 6 is a priority level setting range table showing an example of the setting ranges of the analysis priority levels 41 and the generation priority levels 51. The priority level setting range table of FIG. 6 shows, as range conditions 401 to 405, examples of the setting ranges of the analysis priority levels 41 and the generation priority levels 51 for each of the setting conditions 201 to 205. The range conditions 401 to 405 indicate which mesh is set as a target to set values of the analysis priority levels 41 and the generation priority levels 51 and whether the analysis processing is performed according to these values to generate information for applications.

Note that the setting conditions 201 to 205 are the same as the setting conditions 201 to 205 in the generation priority level table of FIG. 4 and the analysis priority level table of FIG. 5.

Note that the setting ranges of the analysis priority levels 41 and the generation priority levels 51 shown in the priority level setting range table of FIG. 6 are examples. Which mesh is set as a setting target of the analysis priority levels 41 and the generation priority levels 51 for each of the setting conditions is not limited to this. The setting ranges may be decided according to other reference units, for example, reference units such as a distance, a geographical feature, and an administrative district rather than the mesh units.

Figure 7:
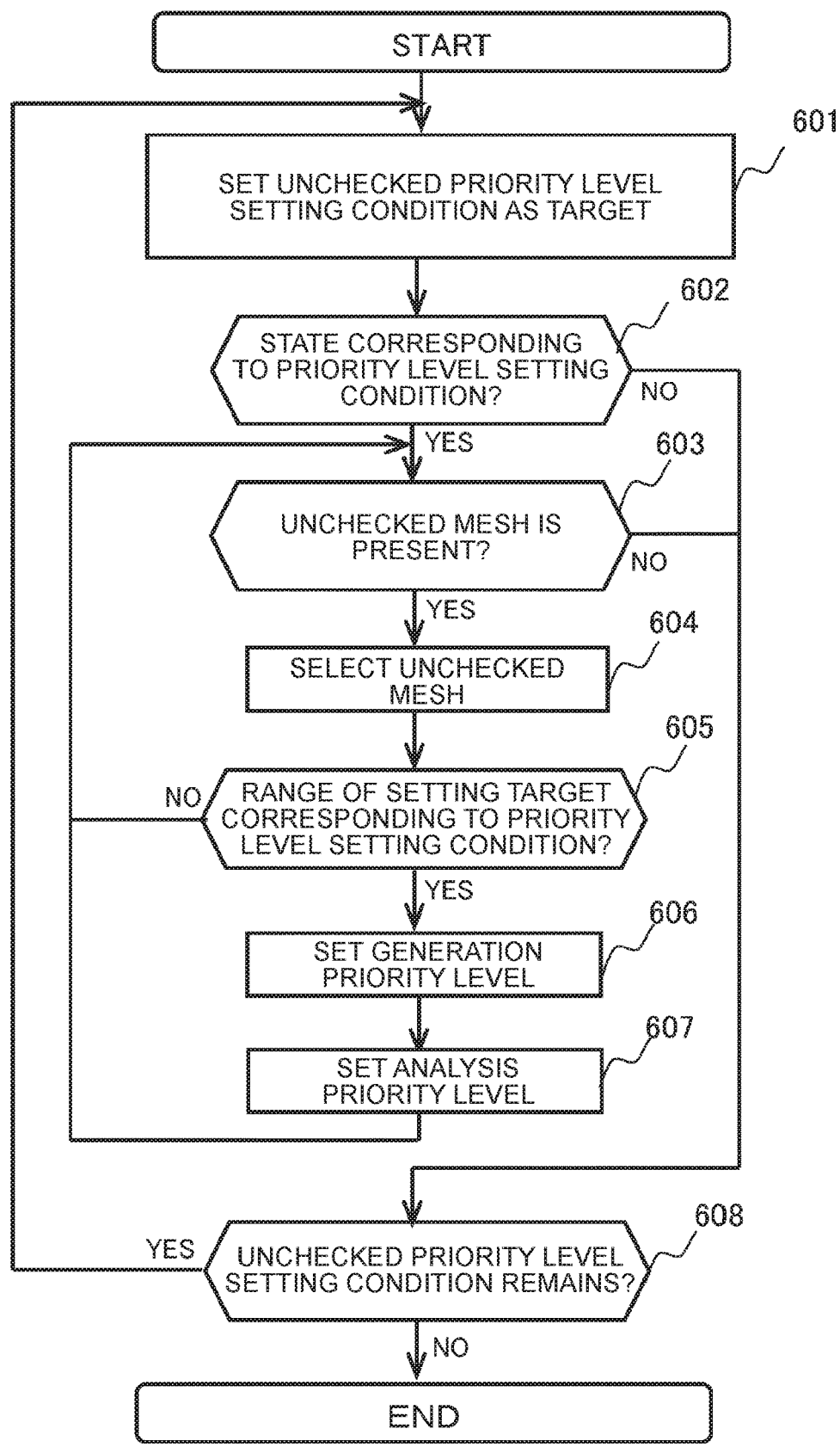
FIG. 7 is a flowchart showing a setting procedure for the analysis priority levels and the generation priority levels.

Next, a setting procedure for the analysis priority levels 41 and the generation priority levels 51 is explained. FIG. 7 is a flowchart showing the setting procedure for the analysis priority levels 41 and the generation priority levels 51. When performing processing concerning the navigation operation using the map data 4, the control unit 1 repeatedly executes processing shown in the flowchart of FIG. 7 in parallel to other processing. Note that a processing cycle of FIG. 7 may be fixed or may be variable according to a processing load or the like of the control unit 1.

In step 601, the control unit 1 selects any one of unchecked priority level setting conditions as a processing target in the following processing. The setting conditions 201 to 205 shown in FIGS. 4 to 6 are selected as targets in order.

In step 602, the control unit 1 determines whether the present state of the navigation system 20 is a state corresponding to the priority level setting condition selected in step 601. The control unit 1 determines, based on the operation information input to the operation input unit 5 from the operation unit 10 and a state of the navigation operation in the navigation system 20, whether the selected setting conditions among the setting conditions 201 to 205 are satisfied. As a result, when determining that the setting conditions are satisfied, the control unit 1 advances the processing to step 603. When determining that the setting conditions are not satisfied, the control unit 1 advances the processing to step 608.

In step 603, the control unit 1 determines whether an unchecked mesh is present in the map data 4. As a result, when an unchecked mesh is present, the control unit 1 advances the processing to step 604. When an unchecked mesh is absent, that is, when all meshes are checked, the control unit 1 advances the processing to step 608. Note that it is unrealistic to check all the meshes for which the map information is set in the map data 4 because the processing is enormous. Accordingly, meshes set as check targets may be limited to a fixed range such as a predetermined distance from the present position of the own vehicle.

In step 604, the control unit 1 selects any one of the meshes determined as unchecked in step 603. For example, the control unit 1 selects the meshes in order from the mesh closest to the present position of the own vehicle.

In step 605, the control unit 1 determines whether the mesh selected in step 604 is within a range corresponding to the priority level setting condition selected in step 601. For example, the control unit 1 specifies a setting range corresponding to the setting condition selected in step 601 referring to the priority level setting range table shown in FIG. 6 and determines whether the mesh selected in step 604 is within the setting range. As a result, if the mesh is within the setting range, the control unit 1 advances the processing to step 606. If the mesh is outside the setting range, the control unit 1 returns the processing to step 603.

In step 606, the control unit 1 sets, for the kinds of information for applications, generation priority levels corresponding to the priority level setting condition selected in step 601. For example, the control unit 1 specifies values of the generation priority levels 51 of the kinds of information for applications in the selected setting condition among the setting conditions 201 to 205 referring to the generation priority level table shown in FIG. 4 and sets the values for the kinds of information for applications. The control unit 1 stores the set values of the generation priority levels 51 in the temporary storage unit 2.

In step 607, the control unit 1 sets, for the kinds of analysis processing, an analysis priority level corresponding to the priority level setting condition selected in step 601. For example, the control unit 1 specifies values of the analysis priority levels 41 of the kinds of analysis processing in the selected setting condition among the setting conditions 201 to 205 referring to the analysis priority level table shown in FIG. 5 and sets the values for the kinds of analysis processing. The control unit 1 stores the set values of the analysis priority levels 41 in the temporary storage unit 2. After executing step 607, the control unit 1 returns the processing to step 603.

In step 608, the control unit 1 determines whether an unchecked priority level setting condition remains. As a result, when an unchecked priority level setting condition is present, the control unit 1 returns the processing to step 601. When an unchecked priority level setting condition is absent, that is, all the priority level setting conditions are checked, the control unit 1 ends the processing shown in the flowchart of FIG. 7.

According to the processing explained above, the control unit 1 can determine, based on the operation information input to the operation input unit 5 from the operation unit 10 and a state of the navigation operation in the navigation system 20, a mesh in a map range for setting the analysis priority levels 41 and the generation priority levels 51 and set the analysis priority levels 41 and the generation priority levels 51 targeting the mesh.

FIG. 8 and FIG. 9 are management tables showing examples in which the generation priority levels 51 and the analysis priority levels 41 are respectively set for each of meshes according to the procedure shown in FIG. 7. A cache data management table of FIG. 8 shows setting values and setting states of the generation priority levels 51 for the kinds of information for applications of the cache data 50. An analysis data management table of FIG. 9 shows setting values and analysis states of the analysis priority levels 41 for the analysis results of the analysis data 40. These management tables are stored in, for example, the temporary storage unit 2.

In the cache data management table of FIG. 8, for each of meshes identified by mesh IDs 700, values of the generation priority levels 51 set in the kinds of information for applications such as the drawing information for applications 52, the road information for applications 53, the point information for applications 54, the guidance information for applications 55, and the driving support information for applications 56 and generation states 701 of the kinds of information for applications are represented. Note that the values of the generation priority levels 51 of the kinds of information for applications in FIG. 8 correspond to the values of the generation priority levels 51 of the kinds of information for applications in the setting condition 202 in the generation priority level table shown in FIG. 4. That is, the cache data management table of FIG. 8 represents values of the generation priority levels 51 set when the operation unit 10 is configured by a touch panel and operation information indicating that the user touches the touch panel is input.

In the analysis data management table of FIG. 9, for each of meshes identified by the mesh IDs 700, values of the analysis priority levels 41 set for the analysis results such as the geographical feature information analysis result 42, the road information analysis result 43, the icon information analysis result 44, the point information analysis result 45, and the high-accuracy map information analysis result 46 and analysis states 702 of the analysis results are represented. Note that the values of the analysis priority levels 41 of the analysis results in FIG. 9 correspond to the values of the analysis priority levels 41 of the kinds of analysis processing in the setting condition 202 in the analysis priority level table shown in FIG. 5. That is, the analysis data management table of FIG. 9 represents values of the analysis priority levels 41 set when the operation unit 10 is configured by a touch panel and operation information indicating that the user touches the touch panel is input.

Figure 10:
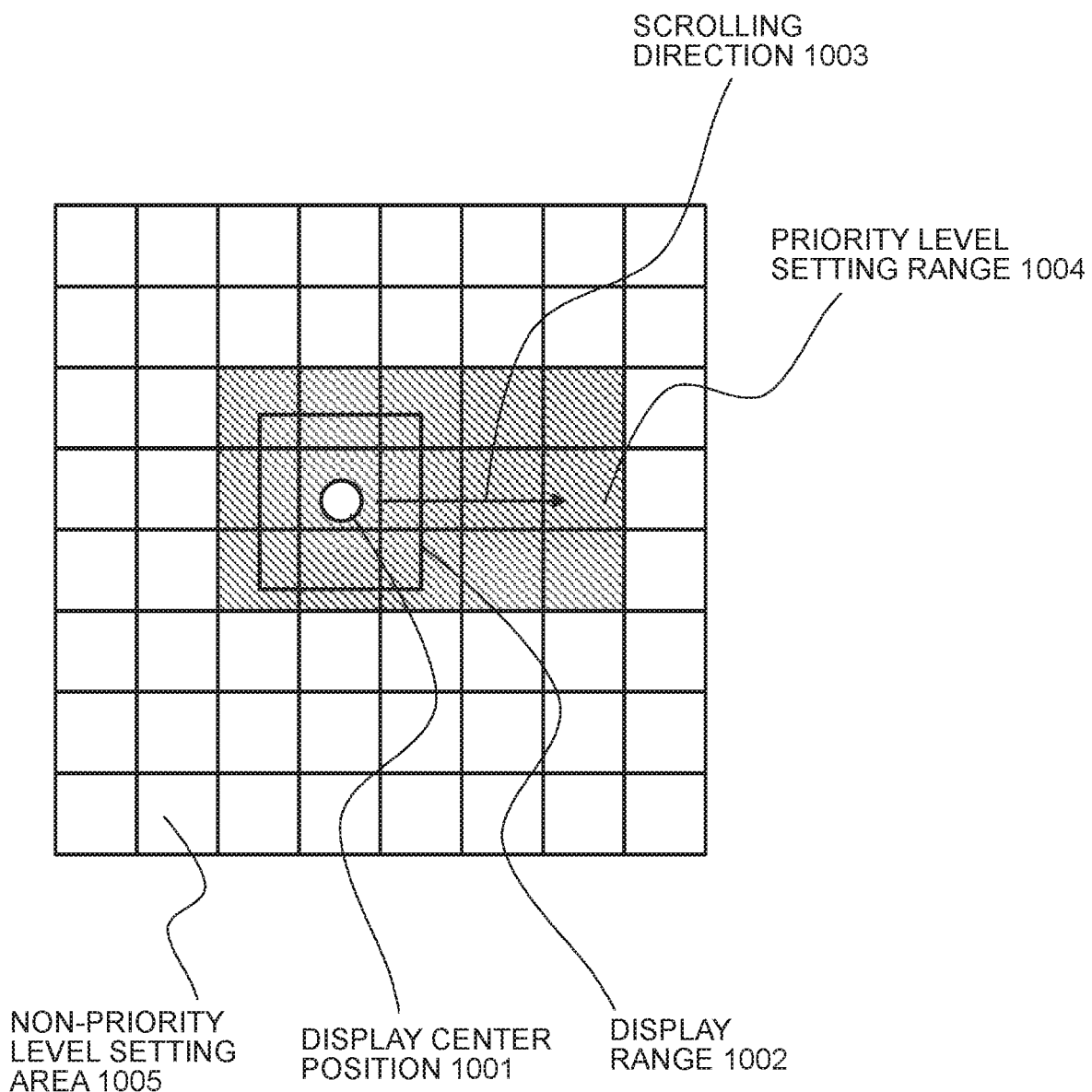
FIG. 10 is a diagram showing an example of a map range in which the generation priority levels and the analysis priority levels are set.

FIG. 10 is a diagram showing an example of a map range for setting the generation priority levels 51 and the analysis priority levels 41 according to the procedure shown in FIG. 7. In FIG. 10, meshes near a display center position 1001 among meshes divided in a lattice shape for each of predetermined distance intervals in the latitude direction and the longitude direction in the map data 4. Note that, in FIG. 10, the upward, downward, left, and right directions respectively correspond to the north, the south, the west, and the east of a map.

In FIG. 10, a display range 1002 indicated by a rectangular frame represents a display range of a map that the control unit 1 displays on the display unit 11 by controlling the display output unit 6. The center of this display range 1002 is the display center position 1001 and is equivalent to, for example, the present position of the own vehicle.

It is assumed that the operation unit 10 is configured by a touch panel and the user touches a position corresponding to the east with respect to the display center position 1001 on the touch panel and instructs eastward scrolling. In this case, as indicated by an arrow in FIG. 10, the control unit 1 determines that a scrolling direction 1003 is the eastward from a relation between the display center position 1001 and the touch position and starts scrolling of a map screen. In that case, the control unit 1 determines, based on the operation information input to the operation input unit 5 from the operation unit 10, that the setting condition 202 is satisfied and specifies a range condition 402 corresponding to the setting condition 202 referring to the priority level setting range table shown in FIG. 6. The control unit 1 decides, as a map range indicated by the range condition 402, a priority level setting range 1004 indicated by hatching in FIG. 10. The control unit 1 sets the generation priority levels 51 and the analysis priority levels 41 for meshes corresponding to the priority level setting range 1004. Consequently, at a stage when the scrolling direction of the map screen is detected, the control unit 1 can determine meshes present in the direction as a map range and more quickly complete generation of necessary information for applications using a time in which the display range 1002 is actually moving. Note that meshes not hatched in FIG. 10 are equivalent to a priority level setting non-target area 1005 where setting of the generation priority levels 51 and the analysis priority levels 41 is not performed.

The control unit 1 refers to the cache data management table of FIG. 8 asynchronous with the operation performed by the user of the navigation system 20 to check, concerning the meshes in the priority level setting range 1004, values of the generation priority levels 51 set for each of kinds of information for applications. As a result, when information for applications having high values of the generation priority levels 51 is not generated yet, the control unit 1 performs generation processing for the information for applications. For example, in the example of the cache data management table of FIG. 8, the value of the generation priority level 51 set for the drawing information for applications 52 is "B" and the values of the generation priority levels 51 of the other information for applications are "C" or "D". Accordingly, the drawing information for applications 52 is preferentially generated.

Figure 11:
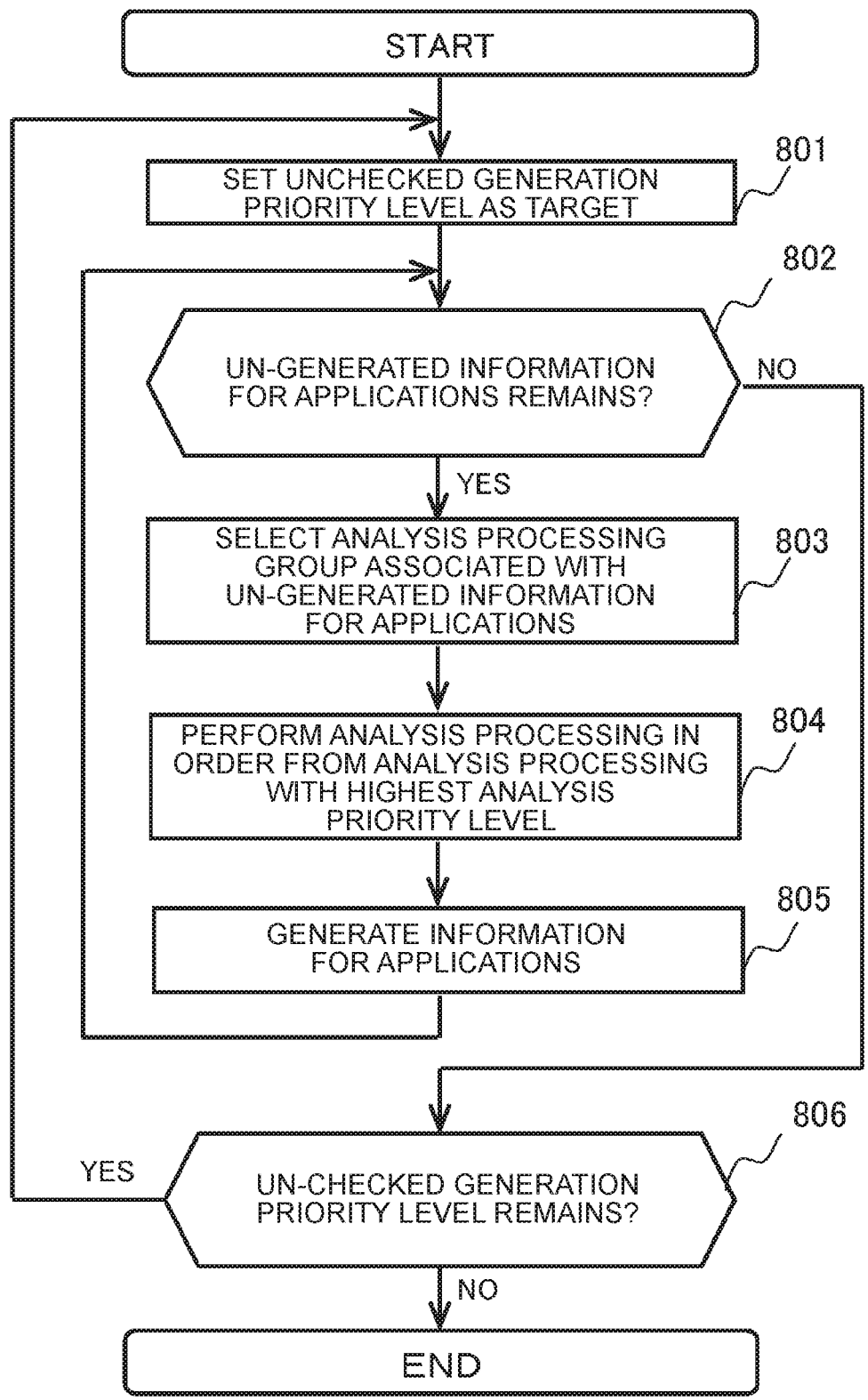
FIG. 11 is a flowchart showing a generation procedure for analysis data and cache data according to the first embodiment of the present invention.

Next, a generation procedure for the analysis data 40 and the cache data 50 is explained. FIG. 11 is a flowchart showing a generation procedure for the analysis data 40 and the cache data 50 according to the first embodiment of the present invention. In this embodiment, when performing processing concerning the navigation operation using the map data 4, the control unit 1 repeatedly executes processing shown in the flowchart of FIG. 11 in parallel to other processing. This processing is performed targeting the meshes in the priority level setting range 1004 shown in FIG. 10, that is, meshes for which the analysis priority levels 41 and the generation priority levels 51 are set in the procedure shown in the flowchart of FIG. 7. Note that a processing cycle of FIG. 11 may be fixed or may be variable according to a processing load or the like of the control unit 1.

In step 801, the control unit 1 selects, as the following processing target, any one of unchecked generation priority levels. The control unit 1 selects, out of generation priority levels unselected as processing targets, values of the generation priority levels 51 in descending order of the priority levels, that is, the order of A, B, C, and D. Specifically, when executing step 801 first, the control unit 1 selects "A", which is the highest value of the generation priority level 51, as a processing target. Thereafter, after executing processing in step 802 and subsequent steps concerning the generation priority level "A", the control unit 1 selects "B", which is a value of the second highest generation priority level 51, as a processing target. In this way, every time step 801 is executed, the control unit 1 reduces a value of a generation priority level selected as a processing target.

In step 802, the control unit 1 determines whether un-generated information for applications corresponding to the generation priority level selected in step 801 remains. The control unit 1 determines, referring to the cache data management table of FIG. 8, whether the values of the generation priority levels 51 are equal to or larger than the generation priority level selected in step 801 and information for applications, the generation state 701 of which is "un-generated", is present. As a result, when un-generated information for applications corresponding to the selected generation priority level is present, the control unit 1 advances the processing to step 803. When un-generated information for applications is absent, that is, when all kinds of information for applications corresponding to the selected generation priority level are generated, the control unit 1 advances the processing to step 806.

In step 803, the control unit 1 selects an analysis processing group associated with the un-generated information for applications determined in step 802. The control unit 1 selects, based on the relation between the analysis results of the map information and the information for applications shown in FIG. 3, in the analysis data 40, one or more analysis results used for generation of the information for applications and selects, as the analysis processing group associated with the un-generated information for applications, one or more kinds of analysis processing corresponding to the analysis results. For example, when determining in step 802 that the drawing information for applications 52 is the un-generated information for applications, in step 803, the control unit 1 selects the geographical feature information analysis 211 and the road information analysis 212 as an analysis processing group associated with the drawing information for applications 52.

In step 804, the control unit 1 implements, in descending order of analysis priority levels, kinds of analysis processing included in the analysis processing group selected in step 803. The control unit 1 performs the analysis processing in order from the analysis processing having the highest value of the analysis priority level 41 referring to the analysis data management table of FIG. 9. For example, when the geographical feature information analysis 211 and the road information analysis 212 are selected in step 803 as the analysis processing group associated with the drawing information for applications 52, in FIG. 9, a value of the analysis priority level 41 of the geographical feature information analysis result 42 corresponding to the geographical feature information analysis 211 is "C" and a value of the analysis priority level 41 of the road information analysis result 43 corresponding to the road information analysis 212 is "A". Accordingly, the control unit 1 implements the road information analysis 212 first and implements the geographical feature information analysis 211 thereafter. At this time, when the analysis state 702 is "analyzed", since an analysis result for the analysis processing is already obtained, the analysis processing is omitted. When the analysis processing ends, the control unit 1 stores an analysis result of the analysis processing in the temporary storage unit 2 as the analysis data 40 and rewrites the analysis state 702 from "un-analyzed" to "analyzed". When all the kinds of analysis processing in the selected analysis processing group are completed in this way, the control unit 1 advances the processing to step 805.

In step 805, the control unit 1 generates, based on analysis results obtained by the analysis processing in step 804, the information for applications determined as un-generated in step 802. When the information for applications is successfully generated, the control unit 1 stores the generated information for applications in the temporary storage unit 2 as the cache data 50 and rewrites the generation state 701 of the information for applications from "un-generated" to "generated" in the cache data management table of FIG. 8. At this time, the control unit 1 may delete the analysis data 40 made unnecessary from the temporary storage unit 2. After executing step 805, the control unit 1 returns the processing to step 802.

In step 806, the control unit 1 determines whether an unchecked generation priority level remains. As a result, when an unchecked generation priority level is present, the control unit 1 returns the processing to step 801. When an unchecked generation priority level is absent, that is, all the generation priority levels are checked, the control unit 1 ends the processing shown in the flowchart of FIG. 11.

According to the processing explained above, the control unit 1 performs, with at least one kind of map information set as an analysis target, the analysis processing in order according to the values of the analysis priority levels 41 set in FIG. 7 and generates, based on an obtained analysis result, the information for applications in order according to the values of the generation priority levels 51 set in FIG. 7. The control unit 1 saves the generated information for applications in the temporary storage unit 2 to make it possible to execute processing concerning the navigation operation using the information for applications.

For example, in the generation priority level table of FIG. 4, a value of the generation priority level for the point information for applications 54 in the setting condition 202 is set lower than a value of the generation priority level for the drawing information for applications 52. Accordingly, when the setting condition 202 is satisfied, the control unit 1 can put off the generation of the point information for applications 54 and generate the drawing information for applications 52 earlier. As a result, when performing the scrolling of the map screen, the control unit 1 can complete, with the map-drawing processing unit 102, drawing processing for other than icons first using the generated drawing information for applications 52. Therefore, it is possible to quickly present a map image at a scrolling destination.

In the generation priority level table of FIG. 4, a value of the generation priority level for the point information for applications 54 in the setting condition 202 is set higher than values of the generation priority levels for the road information for applications 53 and the guidance information for applications 55. Accordingly, when the setting condition 202 is satisfied, the control unit 1 can generate the point information for applications 54 earlier than the road information for applications 53 and the guidance information for applications 55. As a result, when performing the scrolling of the map screen, after completing the drawing processing for other than icons with the map-drawing processing unit 102 more preferentially than the operation of the route-search processing unit 103 and the guidance processing unit 104, the control unit 1 can complete the drawing processing for the icons using the generated point information for applications 54.

FIG. 12 shows examples of a map screen displayed on the display unit 11 using the analysis data 40 and the cache data 50 generated by the generation procedure explained with reference to FIG. 11. In FIG. 12, map screens 900 and 910 are shown as examples of a map screen in the case in which the setting condition 202 is satisfied. The map screen 900 represents a map screen displayed immediately after scrolling. The map screen 910 represents a map screen displayed after a certain degree of time elapses after the scrolling.

On the map screen 910, compared with the map screen 900, icons 911, 912, and 913 respectively indicating specific points on a map and point information 914 concerning the point indicated by the icon 911 are further displayed. The point information 914 represents a name and opening hours of a store present at the point indicated by the icon 911. On the other hand, on the map screen 900, these kinds of information are not displayed. Only road shapes and geographical features drawn using the preferentially generated drawing information for applications 52 are displayed.

Note that, in the examples shown in FIG. 12, a difference in display timing between the road shapes and the geographical features and the point information and the icons at the time when the map screen is scrolled is shown. However, effects obtained by the generation procedure for the analysis data 40 and the cache data 50 explained with reference to FIG. 11 are not limited to this. With the generation procedure shown in FIG. 11, it is possible to, according to preset various setting conditions, provide information with a high priority level first and provide information with a relatively low priority level thereafter. As a result, it is possible to reduce a user waiting time.

For example, when the user operates a user interface of a route searching function and opens a menu screen or the like, the control unit 1 detects this based on operation information from the operation input unit 5 and determines that the setting condition 203 is satisfied. In this case, the control unit 1 calculates, with the processing by the action-prediction processing unit 106, meshes matching a route searched in the past and meshes matching a route having high search possibility. The control unit 1 sets, for the calculated meshes in the ranges, the generation priority levels 51 and the analysis priority levels 41 with the processing shown in FIG. 7 and generates information for applications according to the generation procedure shown in FIG. 11. Among values of the generation priority levels 51 set for the setting condition 203 in the generation priority level table of FIG. 4, a value of the generation priority level 51 of the road information for applications 53, which is information for applications at least necessary for the route-search processing unit 103 to perform a route search, is the highest. A value of the generation priority level 51 of the point information for applications 54, which is information for applications highly likely to be necessary for the route search, is the second highest. By setting the values of the generation priority levels 51 in this way, it is possible to prepare, before a search for a route is actually started, information required by the route-search processing unit 103 concerning a route highly likely to be searched by the user.

When the processing by the route-search processing unit 103 is completed, the control unit 1 determines that the setting condition 204 is satisfied at that point in time. The control unit 1 refers to calculated route information, sets, for the meshes corresponding to the route, the generation priority levels 51 and the analysis priority levels 41 with the processing shown in FIG. 7, and generates information for applications according to the generation procedure shown in FIG. 11. Among values of the generation priority levels 51 set for the setting condition 204 in the generation priority level table of FIG. 4, values of the generation priority levels 51 of the road information for applications 53 and the guidance information for applications 55, which are information for applications necessary for the guidance processing unit 104 to perform guidance, are the highest. By setting the values of the generation priority levels 51 in this way, it is possible to generate, before the processing is actually started, information required by the guidance processing unit 104 that operates after the route search processing. Note that, by referring to the information managed by the position-information managing unit 108, the values of the generation priority levels 51 respectively set for the road information for applications 53 and the guidance information for applications 55 may be set higher for meshes closer to the position of the own vehicle. In this way, it is also possible to generate necessary information for applications more preferentially for meshes to which the own vehicle moves to reach at an earlier time.

Note that it is also possible to simultaneously set a plurality of setting conditions for the same mesh and set the generation priority levels 51 and the analysis priority levels 41 according to the respective setting conditions. For example, when the setting condition 201 and the setting condition 205 are simultaneously satisfied, according to the priority level setting range table of FIG. 6, the control unit 1 applies the setting condition 201 and sets the generation priority levels 51 and the analysis priority levels 41 for meshes within a radius of one sheet from the display center and applies the setting condition 205 and sets the generation priority levels 51 and the analysis priority levels 41 for meshes to which a road on which the own vehicle position is present is connected. Accordingly, in the meshes simultaneously satisfying these conditions, the setting condition 201 and the setting condition 205 are redundantly applied. In such a case, for example, higher values of setting values of the generation priority levels 51 and the analysis priority levels 41 respectively decided for the two setting conditions only have to be set as values of the generation priority levels 51 for kinds of information for applications of the meshes and values of the analysis priority levels 41 for kinds of analysis processing.

Specifically, in the generation priority level table of FIG. 4, for example, the setting value of the generation priority level 51 for the drawing information for applications 52 is decided as respectively "B" in the setting condition 201 and "-" (non-setting target) in the setting condition 205. Accordingly, "B", which is the higher value, can be set as a value of the generation priority level 51 for the drawing information for applications 52. Similarly, "A", "B", "D", and "A" can be respectively set for the road information for applications 53, the point information for applications 54, the guidance information for applications 55, and the driving support information for applications 56 as values of the generation priority levels 51.

In the analysis priority level table of FIG. 5, for example, the setting value of the analysis priority level 41 for the geographical feature information analysis 211 is decided respectively as "C" in the setting condition 201 and "C" in the setting condition 205. Accordingly, "C" can be set as a value of the analysis priority level 41 for the geographical feature information analysis 211. Similarly, "A", "B", "D", and "B" can be set as values of the respective analysis priority levels 41 for the road information analysis 212, the icon information analysis 213, the point information analysis 214, and the high-accuracy map information analysis 215.

By respectively setting the values of the generation priority levels 51 and the analysis priority levels 41 in this way, when it is necessary to perform generation of driving assistance information by the driving-assistance processing unit 105 more preferentially than display of a map, it is possible to perform generation of the road information for applications 53 and the driving support information for applications 56, which are information for applications necessary for the generation of the driving assistance information, more preferentially than generation of the other information for applications. Accordingly, it is possible to guarantee safety for traveling of the own vehicle.

The values of the generation priority levels 51 and the analysis priority levels 41 may be dynamically changed. For example, in the following explanation, in the setting condition 205, in the process of the processing by the driving-assistance processing unit 105, the control unit 1 needs to refer to a part of the information retained by the high-accuracy map information 35 without waiting for linkage with a road ID of the road information 32. In this case, usually, a value of the analysis priority level 41 for the road information analysis 212 for analyzing the road information 32 and obtaining the road information analysis result 43 and a value of the analysis priority level 41 for the high-accuracy map information analysis 215 for analyzing the high-accuracy map information 35 and obtaining the high-accuracy map information analysis result 46 are set according to the analysis priority level table of FIG. 5. That is, in the setting condition 205, since usability of the road information analysis result 43 is high, a value of the analysis priority level 41 for the road information analysis 212 is set to "A" and a value of the analysis priority level 41 for the high-accuracy map information analysis 215 is set to "B" lower than "A".

In such a state, when it is necessary to refer to the high-accuracy map information 35 as explained above, the control unit 1 dynamically changes the values of the analysis priority levels 41 and, for example, sets the value of the analysis priority level 41 for the road information analysis 212 to "B" and sets the value of the analysis priority level 41 for the high-accuracy map information analysis 215 to "A". As a result, it is possible to obtain the high-accuracy map information analysis result 46 more preferentially than the road information analysis result 43. Therefore, it is possible to flexibly cope with, for example, a state change of the navigation operation.

Note that, in the example explained above, the values of the analysis priority levels 41 are dynamically changed. However, similarly, the values of the generation priority levels 51 may be dynamically changed. In the example explained above, it is necessary to refer to the high-accuracy map information 35. However, the present invention is applicable in the other situations. In that case, types of information for applications and map information for dynamically changing the values of the generation priority levels 51 and the analysis priority levels 41 are not limited to specific types and can be optionally applied.

According to the first embodiment of the present invention explained above, the following action and effects are achieved.

(1) The navigation system 20 performs, using the map data 4 formed by the plurality of kinds of map information, the navigation operation for guiding the own vehicle, which is the mobile body. The navigation system 20 includes the operation input unit 5 to which operation information according to the operation by the user is input, the temporary storage unit 2 capable of temporarily storing information, and the control unit 1 that generates a plurality of kinds of information for applications based on the map data 4 and executes processing concerning the navigation operation using these kinds of information for applications. The control unit 1 sets, based on at least one of the operation information and a state of the navigation operation, the analysis priority levels 41 for the analysis processing performed for each of the kinds of map information and sets the generation priority levels 51 for each of the kinds of information for applications (steps 602, 606, and 607 in FIG. 7) and performs, with at least one kind of map information among the plurality of kinds of map information set as an analysis target, the analysis processing in order according to the analysis priority levels 41 (step 804 in FIG. 11). The control unit 1 generates the information for applications in order according to the generation priority levels 51 based on results of the analysis processing respectively obtained for the analysis target map information (steps 801 and 805 in FIG. 11) and saves the generated information for applications in the temporary storage unit 2. The control unit 1 executes the processing concerning the navigation operation using the information for applications saved in the temporary storage unit 2 in this way. Consequently, the navigation system 20 is capable of referring to the map data 4 at high speed.

(2) The control unit 1 determines, based on at least one of the operation information and the state of the navigation operation, a map range for setting the analysis priority levels 41 and the generation priority levels 51 (steps 602 and 605 in FIG. 7). Consequently, it is possible to appropriately determine the map range for setting the analysis priority levels 41 and the generation priority levels 51 and generating the information for applications.

(3) The navigation system 20 further includes the map-data input and output unit 3 that acquires the map data 4. The map-data input and output unit 3 acquires, as map data used to generate the information for applications, the map data 4 stored in the navigation system 20. Consequently, it is possible to surely acquire map data necessary in the control unit 1.

Second Embodiment

A second embodiment of the present invention is explained. In this embodiment, explained below is an example of a navigation system that, when values of the generation priority levels 51 and the analysis priority levels 41 are changed while information for applications is generated, changes a kind of map information set as an analysis target and order of analysis processing according to the values of the generation priority levels 51 and the analysis priority levels 41 after the change.

Note that the configuration of the navigation system according to this embodiment is the same as the configuration of the navigation system 20 shown in FIG. 1 explained in the first embodiment. A functional configuration of a control unit of the navigation system according to this embodiment is also the same as the functional configuration of the control unit 1 shown in FIG. 2 explained in the first embodiment. Further, a setting method for the analysis priority levels 41 and the generation priority levels 51 and a determining method for a map range for setting the analysis priority levels 41 and the generation priority levels 51 are also the same as those in the first embodiment. Therefore, in the following explanation, explanation of the configuration, the functional configuration, the setting method, and the determining method is omitted and differences from the first embodiment are mainly explained.

Figure 13:
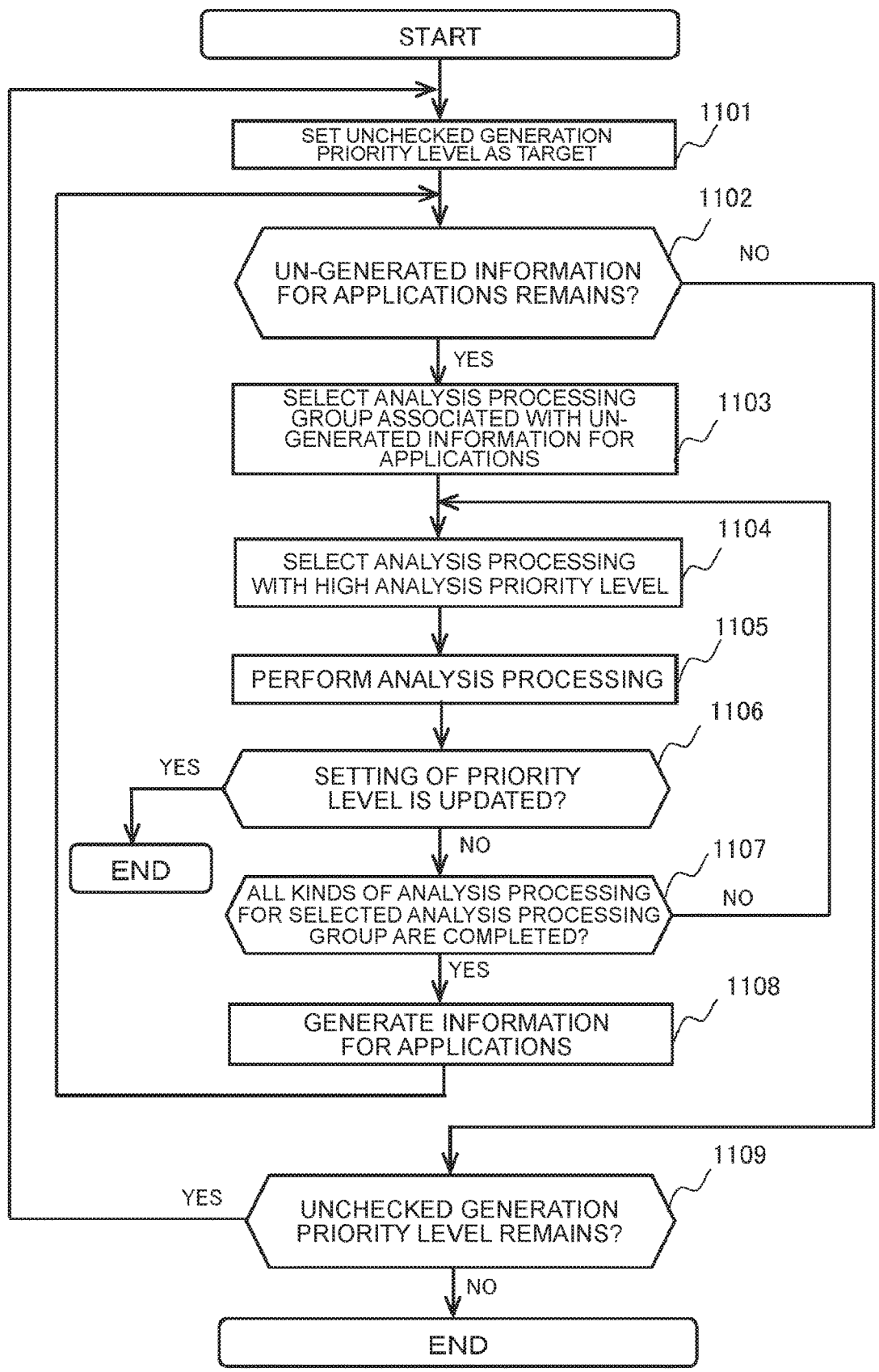
FIG. 13 is a flowchart showing a generation procedure for analysis data and cache data according to a second embodiment of the present invention.

FIG. 13 is a flowchart showing a generation procedure for the analysis data 40 and the cache data 50 according to the second embodiment of the present invention. In this embodiment, as explained in the first embodiment, when performing the processing concerning the navigation operation using the map data 4, the control unit 1 repeatedly executes processing shown in the flowchart of FIG. 13 in parallel to other processing. Note that a processing cycle in FIG. 13 may be fixed or may be variable according to, for example, a processing load of the control unit 1.

In steps 1101 to 1103, kinds of processing respectively the same as steps 801 to 803 in FIG. 11 are performed. That is, in step 1101, the control unit 1 selects, as the following processing target, any one of unchecked generation priority levels in order from the highest generation priority level. In step 1102, the control unit 1 determines whether un-generated information for applications corresponding to the generation priority level selected in step 1101 remains. When the relevant information for applications is present, the control unit 1 advances the processing to step 1103. When the relevant information for applications is absent, the control unit 1 advances the processing to step 1109. In step 1103, the control unit 1 selects an analysis processing group associated with the un-generated information for applications determined in step 1102. For example, when determining in step 1102 that the drawing information for applications 52 is the un-generated information for applications, in step 1103, the control unit 1 selects the geographical feature information analysis 211 and the road information analysis 212 as the analysis processing group associated with the drawing information for applications 52.

In step 1104, the control unit 1 selects un-analyzed analysis processing having the highest value of the analysis priority level among kinds of analysis processing included in the analysis processing group selected in step 1103. The control unit 1 selects analysis processing having the highest value of the analysis priority level 41 among the kinds of analysis processing, the analysis state 702 of which is "un-analyzed", referring to the analysis data management table of FIG. 9. For example, when the control unit 1 selects the geographical feature information analysis 211 and the road information analysis 212 in step 1103 as the analysis processing group associated with the drawing information for applications 52, in FIG. 9, a value of the analysis priority level 41 of the geographical feature information analysis result 42 corresponding to the geographical feature information analysis 211 is "C" and a value of the analysis priority level 41 of the road information analysis result 43 corresponding to the road information analysis 212 is "A". Accordingly, if the road information analysis 212 is not implemented yet, the control unit 1 selects the road information analysis 212 first.

In step 1105, the control unit 1 performs the analysis processing selected in step 1104. When the selected analysis processing ends, the control unit 1 stores an analysis result of the analysis processing in the temporary storage unit 2 as the analysis data 40, rewrites the analysis state 702 in the analysis processing from "un-analyzed" to "analyzed", and advances the processing to step 1106.

In step 1106, the control unit 1 determines whether setting values of at least one of the analysis priority levels 41 and the generation priority levels 51 are updated. The control unit 1 determines, referring to the cache data management table of FIG. 8 and the analysis data management table of FIG. 9, whether values of at least one of the generation priority levels 51 and the analysis priority levels 41 are updated after the processing in FIG. 13 is started. As a result, when the values of at least one of the generation priority levels 51 and the analysis priority levels 41 are updated, the control unit 1 once ends the processing shown in the flowchart of FIG. 13 and resumes the processing from step 1101 using the setting values of the analysis priority levels 41 and the generation priority levels 51 after the update. Consequently, when the setting of the generation priority levels 51 is changed before the generation of the information for applications is completed, according to the generation priority levels 51 after the change, the control unit 1 changes the information for applications for which the selection of the analysis processing group is performed in step 1103 and changes the kind of the map information used in the analysis processing performed in step 1105 after step 1103. When the setting of the analysis priority levels 41 is changed before the generation of the information for applications is completed, the control unit 1 changes the order of the analysis processing selected in step 1104 according to the analysis priority levels 41 after the change. On the other hand, when both of the analysis priority levels 41 and the generation priority levels 51 are not updated, the control unit 1 advances the processing to step 1107.

In step 1107, the control unit 1 determines whether all the kinds of analysis processing included in the analysis processing group selected in step 1103 are completed. If unimplemented analysis processing is present, the control unit 1 returns to step 1104 and continues the analysis processing. If all the kinds of analysis processing are executed, the control unit 1 advances the processing to step 1108.

In step 1108, the control unit 1 generates, based on analysis results obtained by the analysis processing in step 1105, the information for applications determined as un-generated in step 1102. When the information for applications is successfully generated, the control unit 1 stores the generated information for applications in the temporary storage unit 2 as the cache data 50 and rewrites the generation state 701 of the information for applications from "un-generated" to "generated" in the cache data management table of FIG. 8. At this time, the control unit 1 may delete the analysis data 40 made unnecessary from the temporary storage unit 2. After executing step 1108, the control unit 1 returns the processing to step 1102.

In step 1109, the control unit 1 determines whether an unchecked generation priority level remains. As a result, when an unchecked generation priority level is present, the control unit 1 returns the processing to step 1101. When an unchecked generation priority level is absent, that is, when all the generation priority levels are checked, the control unit 1 ends the processing shown in the flowchart of FIG. 13.

According to the processing explained above, as in the first embodiment, the control unit 1 performs, with at least one kind of map information set as an analysis target, the analysis processing in order according to the values of the analysis priority levels 41 set in FIG. 7 and generates, based on an obtained analysis result, information for applications in order according to the values of the generation priority levels 51 set in FIG. 7. The control unit 1 saves the generated information for applications in the temporary storage unit 2 to make it possible to execute the processing concerning the navigation operation using the information for applications. When the values of the generation priority levels 51 and the analysis priority levels 41 are changed while the information for applications is generated, the control unit 1 changes the kind of the map information set as the analysis target and the order of analysis processing according to the values of the generation priority levels 51 and the analysis priority levels 41 after the change and generates information for applications again.

For example, a case is considered in which, while information for applications is generated according to the generation priority levels 51 and the analysis priority levels 41 set according to the setting condition 201, the setting condition 205 is applied and the values of the generation priority levels 51 and the analysis priority levels 41 are changed. In this case, when information for applications is generated according to the setting condition 201 before the change, for example, the drawing information for applications 52 is selected as generation target information for applications based on the values of the generation priority levels 51 set according to the generation priority level table of FIG. 4. In order to generate the drawing information for applications 52, the road information analysis 212 is preferentially executed based on the values of the analysis priority levels 41 set according to the analysis priority level table of FIG. 5.

It is assumed that the setting condition 205 is applied and the values of the generation priority levels 51 and the analysis priority levels 41 are changed in a state in which the road information analysis 212 is completed and the road information analysis result 43 is obtained. At this time, the setting values of the generation priority levels 51 for the road information for applications 53 and the driving support information for applications 56 are respectively changed to "A" according to the generation priority level table of FIG. 4. The setting value of the analysis priority level 41 for the road information analysis 212 is changed to "A" and the setting values of the analysis priority levels 41 for the icon information analysis 213 and the high-accuracy map information analysis 215 are changed to "B" according to the analysis priority level table of FIG. 5.

When the processing in FIG. 13 is resumed according to the values of the generation priority levels 51 and the analysis priority levels 41 changed in this way, for example, the road information for applications 53 is selected as generation target information for applications and the road information analysis 212 is selected as analysis processing that should be executed first. However, as explained above, the road information analysis 212 is executed in the setting condition 201 before the change, whereby the road information analysis result 43 is already obtained. Therefore, it is possible to skip the road information analysis 212 without executing the road information analysis 212 and start the icon information analysis 213 and the high-accuracy map information analysis 215. Therefore, it is possible to achieve an increase in speed of the processing.

According to the second embodiment of the present invention explained above, when the setting of the generation priority levels is changed before the generation of the information for applications is completed, the control unit 1 changes, according to the generation priority levels after the change, the kind of the map information set as the analysis target (step 1101 and 1103). When the setting of the analysis priority levels is changed before the generation of the information for applications is completed, the control unit 1 changes the order of the analysis processing according to the analysis priority levels after the change (steps 1104 and 1105). Consequently, even while the information for applications is generated, it is possible to dynamically change preferentially generated information for applications according to a situation. When a kind of information for applications to be generated is changed, a result of implemented analysis processing can be used. Therefore, it is possible to reduce a reference time of the map data 4 and increase speed of the processing.

Third Embodiment

A third embodiment of the present invention is explained. In this embodiment, an example of a navigation system that acquires the map data 4 from an external information device is explained.

Figure 14:
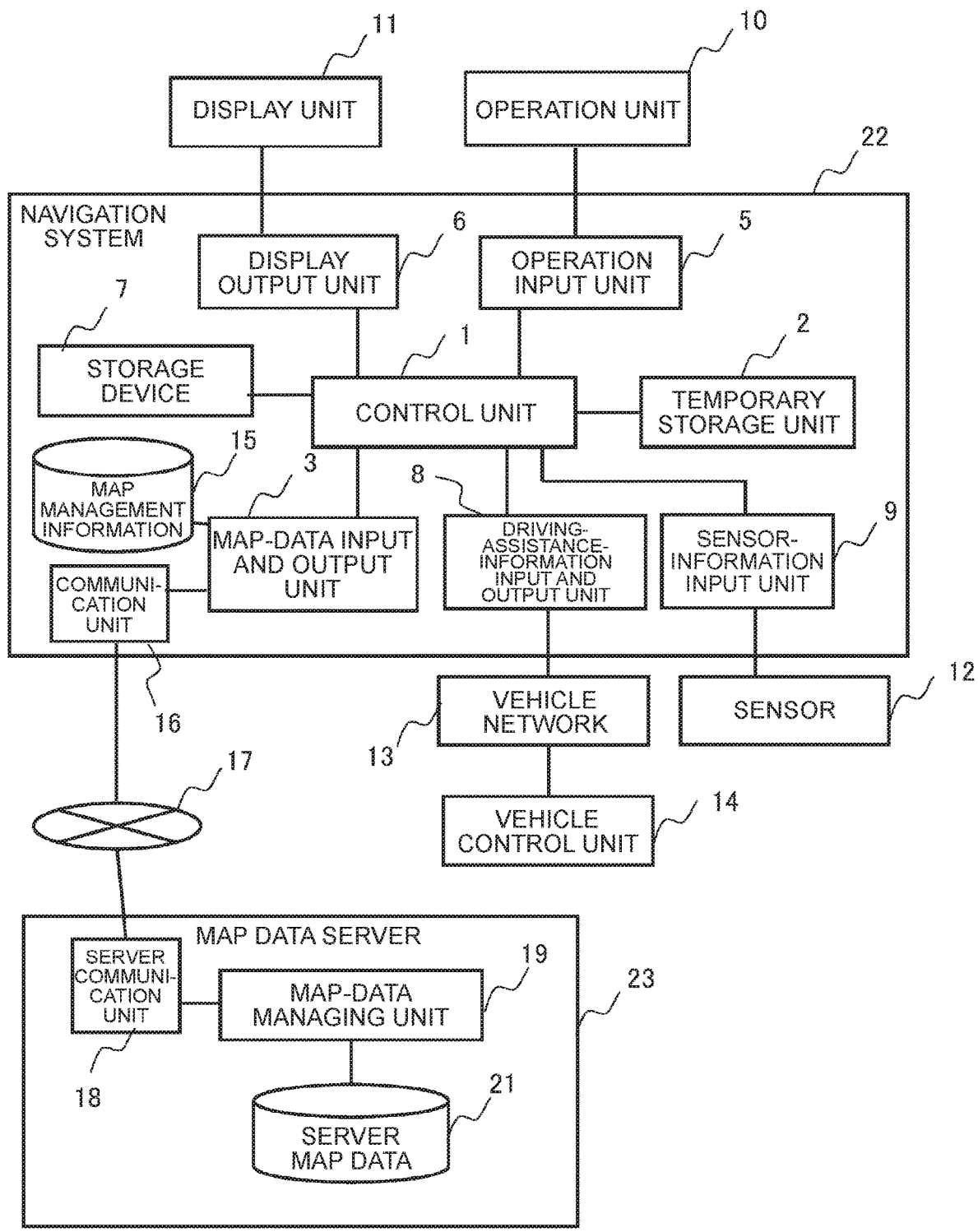
FIG. 14 is a configuration diagram of a navigation system according to a third embodiment of the present invention.

FIG. 14 is a configuration diagram of the navigation system according to the third embodiment of the present invention. In a navigation system 22 shown in FIG. 14, compared with the navigation system 20 shown in FIG. 1 explained in the first embodiment, the map data 4 is not incorporated. Instead, the navigation system 22 includes map management information 15 and a communication unit 16. The map management information 15 and the communication unit 16 are respectively connected to the map data input and output unit 3. In the following explanation, differences from the navigation system 20 shown in FIG. 1 are mainly explained.

In this embodiment, the map-data input and output unit 3 has a function of controlling the communication unit 16 and acquiring map data from a map data server 23, which is an external information device.

The map management information 15 is information necessary for acquiring map data from the map data server 23 and is, for example, address information on a network of the map data server 23. Note that a part of map data such as point information 34 can also be retained as the map management information 15.

The communication unit 16 has a function for communicating with a network 17. The communication unit 16 can perform communication with the map data server 23 via the network 17 and acquire map data. The network 17 is a network in which various information devices including the navigation system 22 and the map data server 23 are capable of communicating with one another. The network 17 is, for example, the Internet.

The map data server 23 includes a server communication unit 18, the map-data managing unit 19, and server map data 21. Like the communication unit 16, the server communication unit 18 has a function for communicating with the network 17. The server communication unit 18 is configured using, for example, a communication adapter device. The map-data managing unit 19 performs operation management for the map data server 23 and is configured using, for example, a CPU controlled by software. The server map data 21 is map data including various kinds of map information necessary in a navigation operation performed by the navigation system 22 and is equivalent to the map data 4 shown in FIG. 1. Note that the server map data 21 is desirably designed on the premise that the server map data 21 is distributed to one or a plurality of navigation systems 22. For example, fixed map data may be always retained as the server map data 21. Alternatively, content of the server map data 21 may be updated at any time based on latest road information, traffic information, and the like.

An acquisition procedure for map data used when the navigation system 22 generates information for applications in this embodiment is explained below.

When generating information for applications according to the procedure shown in FIG. 11 or FIG. 13, the control unit 1 of the navigation system 22 instructs the map-data input and output unit 3 to provide map information set as an analysis target. At this time, necessary map information may be designated in mesh units or may be individually designated using information such as a coordinate serving as a key. When receiving the instruction to provide the map information from the control unit 1, the map-data input and output unit 3 acquires an address of the map data server 23 referring to the map management information 15, controls the communication unit 16, and requests, via the network 17, the map data server 23 to provide the instructed map information.

The provision request for the map information transmitted from the navigation system 22 is received by the server communication unit 18 in the map data server 23 and transmitted to the map-data managing unit 19. The map-data managing unit 19, which receives the provision request, acquires map data including the map information according to request content from the server map data 21. As a response to the navigation system 22, the map-data managing unit 19 returns the acquired map data to the navigation system 22 from the server communication unit 18 via the network 17.

The response from the map data server 23 is received by the communication unit 16 in the navigation system 22. The map-data input and output unit 3 returns, as map data for the provision request from the control unit 1, the map data of the response received by the communication unit 16.

By following such a procedure, when acquiring necessary map data, the control unit 1 of the navigation system 22 does not need to be aware whether the map data is locally present or present on a server. Accordingly, it is possible to generate information for applications according to the same procedure as the procedure explained in the first embodiment and the second embodiment.

According to the third embodiment of the present invention explained above, the navigation system 22 includes the map-data input and output unit 3 that acquires map data. The map-data input and output unit 3 acquires, as the map data used to generate information for applications, the server map data 21 stored in the map data server 23 connected to the navigation system 22 via the network 17. Consequently, it is possible to surely acquire map data necessary in the control unit 1. Since the server map data 21 is updated at any time, it is possible to provide a navigation function, which uses latest map data, to the user with the navigation system 22.

Note that the embodiments and the various modifications explained above are only examples. The present invention is not limited to the contents of the embodiments and the modifications if the features of the invention are not impaired. Although the various embodiments and the various modifications are explained above, the present invention is not limited to the contents of the embodiments and the modifications. Even if there is a change in a scope not departing from the gist of the present invention, the change is included in the scope of the present invention if the change is conceivable in the scope of the technical idea of the present invention.

The disclosed content of the following priority base application is incorporated herein as a reference.

Japanese Patent Application No. 2017-217084 (field on Nov. 10, 2017).

REFERENCE SIGNS LIST 1 control unit
2 temporary storage unit
3 map-data input and output unit
4 map data
5 operation input unit
6 display output unit
7 storage device
8 operation-assistance-information input and output unit
9 sensor-information input unit
41 analysis priority level
51 generation priority level

The invention claimed is:

1. A navigation system for guiding a mobile body using map information, the navigation system comprising:
an input circuit for accepting input data from a user;
a storage device for storing a data structure for the map information, the map information including data structures for a plurality of map features, the map features including geographical features, road information, point information and high accuracy maps; and for storing navigation application map data requirements for a plurality of different navigation applications corresponding to the map features, wherein different navigation applications include display processing, map-drawing processing, route-search processing, guidance processing, and driving-assistance processing, and
a microcomputer coupled to the storage device that generates required data for the plurality of different navigation applications corresponding to the stored navigation application map data requirements, based on the stored map features and executes a process for navigating the mobile body using the required data, wherein the microcomputer:
sets, based on a state of the process for navigating the mobile body, analysis priority levels for analysis processing for each of the map features to determine map data requirements for each of the plurality of different navigation applications and sets generation priority levels for each of the plurality of different navigation applications, wherein the analysis priority levels determine a priority for each of the stored map features, and the generation priority levels determine a priority for generating the map data requirements for each of the plurality of different navigation applications,
executes, for each of map features selected as an analysis target, the analysis processing in an order according to the analysis priority,
generates the map data requirements for the plurality of different navigation applications in an order according to the generation priority levels, based on results of the analysis processing obtained for the map features that are selected as the analysis target,
stores the generated map data requirements for the plurality of different navigation applications, in the storage device, and
executes the process for the navigating the mobile body using the navigation application map data requirements stored in the storage device.

2. The navigation system according to claim 1, wherein the microcomputer determines, based on at least one of the input data and the state of the process for navigating the mobile body, a map range for setting the analysis priority levels and the generation priority levels.

3. The navigation system according to claim 1, wherein
when the setting of the generation priority levels is changed before the generation of the map data requirements for the plurality of different navigation applications is completed, the microcomputer changes, according to the generation priority levels after the change, the map features that are selected as the analysis target, and
when the setting of the analysis priority levels is changed before the generation of the map data requirements for the plurality of different navigation applications is completed, the microcomputer changes the order of the analysis processing according to the analysis priority levels after the change.

4. The navigation system according to claim 1, wherein the microcomputer acquires, as the map data, map data stored in the navigation system or map data stored in a server connected to the navigation system via a network.

5. The navigation system according to claim 1, wherein the input data is generated by a scrolling operation on a display.

6. A navigation method for guiding a mobile body using map data formed by a plurality of map information, the navigation method comprising:
storing a data structure for the map information, the map information including data structures for a plurality of map features, the map features including geographical features, road information, point information and high accuracy maps; and for storing navigation application map data requirements for a plurality of different navigation applications corresponding to the map features, wherein different navigation applications include display processing, map-drawing processing, route-search processing, guidance processing, and driving-assistance processing;
setting, based on at least one of input data received from a user and a state of the process for navigating the mobile body, analysis priority levels for analysis processing performed by a computer for each of the map features to determine map data requirements for each of the plurality of different navigation applications, wherein the analysis priority levels determine a priority for each of the stored map features; and setting generation priority levels for each of the plurality of different navigation applications used by the computer for execution of a process for navigating the mobile body, wherein the generation priority levels determine a priority for generating the map data requirements for each of the plurality of different navigation applications;

executing, for each of map features selected as an analysis target, the analysis processing in an order according to the analysis priority;

generating the map data requirements for the plurality of different navigation applications in an order according to the generation priority levels, based on results of the analysis processing obtained for the map features that are selected as the analysis target, storing the generated map data requirements for the plurality of different navigation applications, in a storage device; and executing the process for the navigating the mobile body using the navigation application map data requirements stored in the storage device.

7. The navigation method according to claim 6, further comprising determining, based on at least one of the input data and the state of the navigation, a map range for setting the analysis priority levels and the generation priority levels.

8. The navigation method according to claim 6, further comprising:

when the setting of the generation priority levels is changed before the generation of the map data requirements for each of the plurality of different navigation applications is completed, changing, according to the generation priority levels after the change, the kind of the map information set as the analysis target, and when the setting of the analysis priority levels is changed before the generation of the map data requirements for each of the plurality of different navigation applications is completed, changing the order of the analysis processing according to the analysis priority levels after the change.

9. The navigation method according to claim 6, wherein the computer is provided in a navigation system, and the navigation method further comprises acquiring, as the map data, map data stored in the navigation system or map data stored in a server connected to the navigation system via a network.

* * * * *